United States Patent
Wong et al.

(10) Patent No.: US 11,907,943 B2
(45) Date of Patent: Feb. 20, 2024

(54) RESOURCE COMPLIANCE SYSTEM USING BITEMPORAL ANALYSIS

(71) Applicant: Capital One Services, LLC, McLean, VA (US)

(72) Inventors: Brian Lee Wong, Midlothian, VA (US); Virendra K. Abelak, Ashburn, VA (US); Steven Lott, McLean, VA (US); Philip Austin Kedy, Oakton, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/516,338

(22) Filed: Nov. 1, 2021

(65) Prior Publication Data
US 2022/0286359 A1    Sep. 8, 2022

Related U.S. Application Data

(60) Provisional application No. 63/157,455, filed on Mar. 5, 2021.

(51) Int. Cl.
| | |
|---|---|
| *G06Q 20/38* | (2012.01) |
| *G06F 16/21* | (2019.01) |
| *G06F 16/215* | (2019.01) |
| *G06F 16/901* | (2019.01) |
| *H04L 41/0806* | (2022.01) |
| *H04L 69/00* | (2022.01) |
| *G06F 16/23* | (2019.01) |
| *G06Q 20/08* | (2012.01) |
| *H04L 41/0816* | (2022.01) |

(Continued)

(52) U.S. Cl.
CPC ........ *G06Q 20/389* (2013.01); *G06F 16/215* (2019.01); *G06F 16/219* (2019.01); *G06F 16/2308* (2019.01); *G06F 16/2358* (2019.01); *G06F 16/2365* (2019.01); *G06F 16/2379* (2019.01); *G06F 16/9024* (2019.01); *G06Q 20/08* (2013.01); *H04L 41/0806* (2013.01); *H04L 41/0816* (2013.01); *H04L 41/0856* (2013.01); *H04L 41/0866* (2013.01); *H04L 67/34* (2013.01); *H04L 69/02* (2013.01); *H04L 69/08* (2013.01); *G06Q 40/00* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 7,681,245 B2 | 3/2010 | Walker et al. | |
| 9,684,570 B1 | 6/2017 | Wilding | |

(Continued)

*Primary Examiner* — Scott B Christensen
(74) *Attorney, Agent, or Firm* — Sterne, Kessler, Goldstein & Fox P.L.L.C.

(57) ABSTRACT

Embodiments disclosed are directed to ensuring resource compliance within a cloud-based environment using a compliance system. The embodiments include steps for performing pre-provisioning checks of resources, such as network protocols, prior to their deployment within the cloud-based environment. The compliance system may include a number of components for performing the pre-provisioning check including a maintenance module, a collection module, and an evaluation module, which are used to evaluate the resource prior to deployment in the cloud-based environment.

20 Claims, 15 Drawing Sheets

(51) Int. Cl.
  *H04L 41/0853* (2022.01)
  *H04L 41/0866* (2022.01)
  *H04L 67/00* (2022.01)
  *H04L 69/08* (2022.01)
  *H04L 9/40* (2022.01)
  *G06Q 40/00* (2023.01)

(56) References Cited

U.S. PATENT DOCUMENTS

| | | | |
|---|---|---|---|
| 10,360,025 B2 | 7/2019 | Foskett et al. | |
| 10,476,947 B1* | 11/2019 | Natarajan | H04L 43/0876 |
| 10,503,905 B1 | 12/2019 | Misra et al. | |
| 10,681,049 B2 | 6/2020 | Jeuk et al. | |
| 10,764,070 B2 | 9/2020 | Kass | |
| 10,789,316 B2 | 9/2020 | Noble et al. | |
| 10,795,977 B2 | 10/2020 | Salomon | |
| 10,866,945 B2 | 12/2020 | Ventura et al. | |
| 10,872,029 B1* | 12/2020 | Bawcom | G06F 21/6218 |
| 10,924,288 B2 | 2/2021 | Yan et al. | |
| 10,949,406 B1* | 3/2021 | Calvo | H04L 41/0853 |
| 11,036,873 B2 | 6/2021 | Lopez | |
| 11,080,257 B2 | 8/2021 | Cseri et al. | |
| 11,140,061 B1* | 10/2021 | Sanders | G06F 21/577 |
| 11,216,788 B1 | 1/2022 | Vijayaraghavan | |
| 11,218,854 B2 | 1/2022 | Raleigh et al. | |
| 11,275,726 B1 | 3/2022 | Mikhtoniuk et al. | |
| 11,350,254 B1* | 5/2022 | Natarajan | H04L 63/108 |
| 11,544,797 B1 | 1/2023 | Cohen | |
| 2007/0156659 A1* | 7/2007 | Lim | H04L 63/20 |
| 2007/0157288 A1* | 7/2007 | Lim | H04L 63/105 726/1 |
| 2007/0185922 A1 | 8/2007 | Kapoor et al. | |
| 2008/0250078 A1 | 10/2008 | Wimberly et al. | |
| 2009/0319501 A1 | 12/2009 | Goldstein et al. | |
| 2011/0231543 A1 | 9/2011 | Akazawa et al. | |
| 2011/0320419 A1 | 12/2011 | Johnston et al. | |
| 2013/0018849 A1 | 1/2013 | Johnston et al. | |
| 2014/0236527 A1 | 8/2014 | Chan et al. | |
| 2015/0135084 A1 | 5/2015 | Rosenberger | |
| 2015/0254330 A1 | 9/2015 | Chan et al. | |
| 2016/0171372 A1 | 6/2016 | Fraleigh et al. | |
| 2016/0342979 A1 | 11/2016 | Joshi et al. | |
| 2018/0144823 A1 | 5/2018 | Raman et al. | |
| 2018/0167492 A1 | 6/2018 | Bonig et al. | |
| 2018/0117446 A1 | 8/2018 | Tran et al. | |
| 2019/0018887 A1 | 1/2019 | Madisetti et al. | |
| 2019/0361917 A1 | 11/2019 | Tran et al. | |
| 2019/0370404 A1 | 12/2019 | Kessee et al. | |
| 2019/0386877 A1* | 12/2019 | Vaidya | H04L 41/40 |
| 2020/0067697 A1 | 2/2020 | Puddu et al. | |
| 2020/0183739 A1 | 6/2020 | Hashimoto et al. | |
| 2020/0252404 A1 | 8/2020 | Padmanabhan | |
| 2020/0344290 A1 | 10/2020 | Krishnaswamy et al. | |
| 2020/0349142 A1 | 11/2020 | Padmanabhan | |
| 2021/0035112 A1* | 2/2021 | Singh | G06N 5/04 |
| 2021/0055927 A1* | 2/2021 | Sarukkai | G06F 8/71 |
| 2021/0157794 A1 | 5/2021 | Tulsi et al. | |
| 2021/0158449 A1 | 5/2021 | Tulsi et al. | |
| 2021/0256009 A1 | 8/2021 | Zhang et al. | |
| 2021/0336896 A1 | 10/2021 | Calmon et al. | |
| 2022/0284422 A1 | 9/2022 | Kedy et al. | |
| 2022/0284423 A1 | 9/2022 | Kedy et al. | |
| 2022/0284424 A1 | 9/2022 | Kedy et al. | |
| 2022/0286352 A1 | 9/2022 | Wong et al. | |
| 2022/0286353 A1 | 9/2022 | Wong et al. | |

* cited by examiner

RESOURCE COMPLIANCE SYSTEM USING BITEMPORAL ANALYSIS

CROSS-REFERENCE TO RELATED APPLICATIONS

This application hereby incorporates by reference for all purposes and claims priority to provisional application No. 63/157,455, entitled "System to Ensure Cloud Resource Compliance Before Provisioning (CloudPRE)," and filed on Mar. 5, 2021.

This application hereby incorporates by reference for all purposes U.S. patent application Ser. No. 17/516,340, entitled "Managing Pre-Provisioning of Resources Using Bitemporal Analysis" and filed on Nov. 1, 2021; U.S. patent application Ser. No. 17/516,329, entitled "Managing Pre-Provisioning and Post-Provisioning of Resources Using Bitemporal Analysis" and filed on Nov. 1, 2021; U.S. patent application 17/516,345, entitled "Immutable Database for Bitemporal Analysis" and filed on Nov. 1, 2021; U.S. patent application Ser. No. 17/516,436, entitled "Architecture of Immutable Database for Bitemporal Analysis" and filed on Nov. 1, 2021; and U.S. patent application Ser. No. 17/516,438, entitled "Immutable Database for Processing Retroactive and Historical Transactions Using Bitemporal Analysis" and filed on Nov. 1, 201. The incorporated matter may be considered to further define any of the functions, methods, and systems described herein.

TECHNICAL FIELD

This application is generally directed to improving cloud protocol compliance of resources in a cloud network using a compliance system for performing pre-provisioning check of the resources.

BACKGROUND

Enterprise network environments, including those that utilize a cloud-based infrastructure, are continuously updated with new network resources. Prior to deployment, resources in these environments require checks to ensure that they are compliant with all necessary policies that govern those environments.

As cloud footprints and scale increase for enterprises, so too does the complexity in managing the provisioning of resources and ensuring their compliance with policies within those environments. Existing approaches rely solely on a reactive approach by detecting any operational errors in the environment after the resources have been deployed. These existing approaches present a number of problems including the inability to scale as the number of resources and policies increases and that non-compliant resources can be deployed in the environment which could cause operational delays and errors until the non-compliance is detected.

BRIEF DESCRIPTION OF THE DRAWINGS

In the drawings, like reference numbers generally indicate identical or similar elements. Additionally, generally, the left-most digit(s) of a reference number identifies the drawing in which the reference number first appears.

SUMMARY

Figure 1:
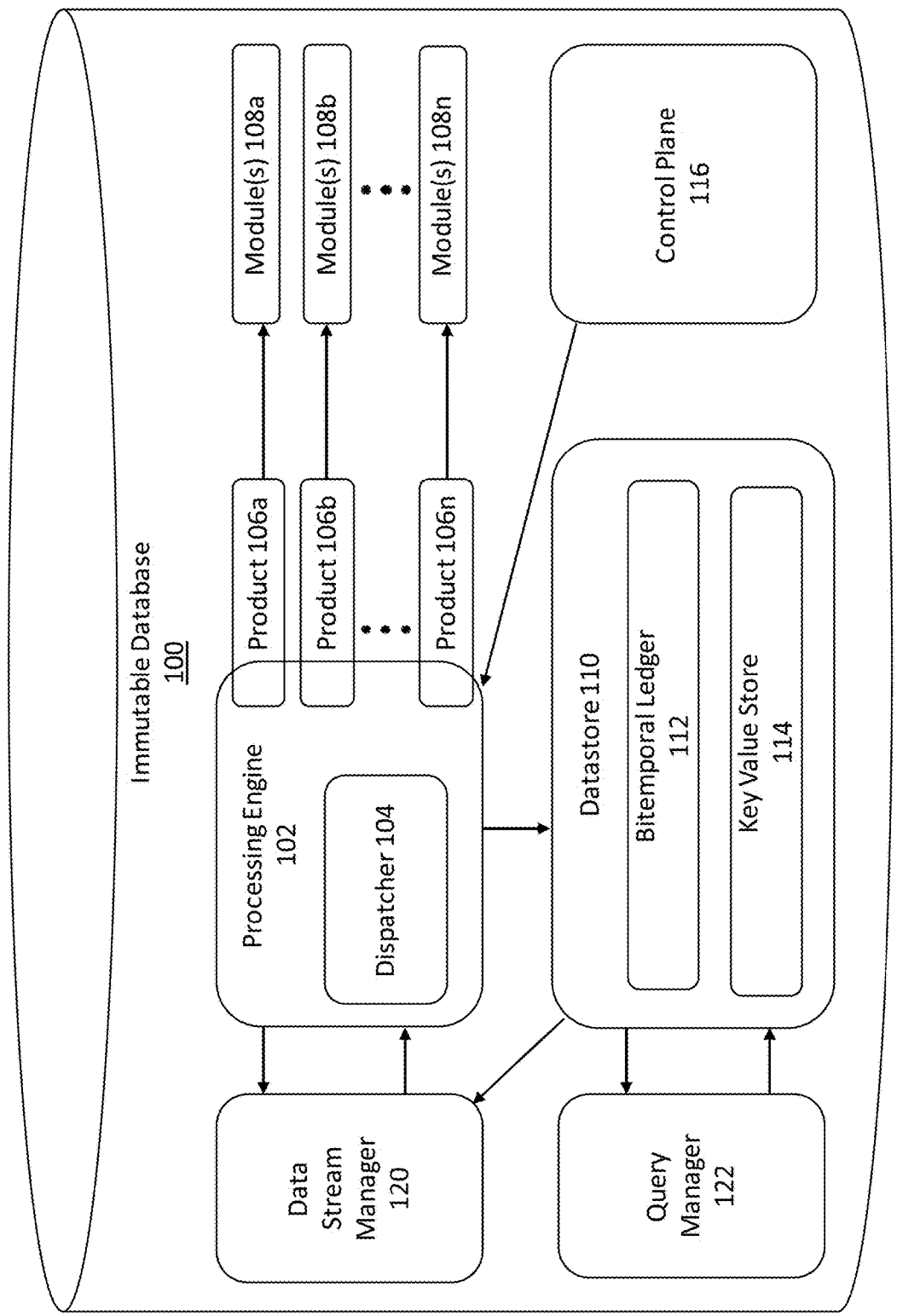
FIG. 1 is a block diagram of an immutable database, according to some embodiments.

Provided herein are system, apparatus, article of manufacture, tangible computer-readable medium, method and/or computer program product embodiments, and/or combinations and sub-combinations thereof, for performing pre-provisioning checks of resources prior to their deployment within a network environment, such as a cloud-based platform, through the use of processing timelines and bitemporal analysis. In some embodiments, the timelines are provided via an immutable database that can create multiples timelines for processing transactions and queries.

Several embodiments are also directed to computer-implemented methods for improving cloud protocol compliance in a cloud network, which includes a compliance system for testing new protocols. The method is performed by the compliance system and may include receiving a first request to provision a new protocol in the cloud network. The compliance system may include a number of modules which are utilized for testing compliance including a maintenance module, a collection module, and an evaluation module. Prior to provisioning the new protocol in the cloud network, the maintenance module may initiate a pre-provisioning evaluation of the new protocol which further includes the steps of the maintenance module transmitting to the collection module, a second request to evaluate the new protocol, the collection module generating an evaluation data file comprising the new protocol and data associated with executing the new protocol. The data may comprise information needed to provision the new protocol. Additional steps may include transmitting, from the collection module to the evaluation module, the evaluation data file and the evaluation module determining the pre-provisioning evaluation of the new protocol based on the evaluation data file responsive to receiving the evaluation data file. The evaluation may indicate whether the new protocol is compliant or non-compliant with the cloud network.

Several embodiments are also directed to computer-implemented methods for improving protocol compliance in a cloud-based system by performing a pre-provisioning check of a resource such as a new protocol to be implemented within the cloud-based system. The method includes using timelines for testing the resource prior to deployment and includes storing a current execution timeline of the cloud network. The current execution timeline includes a current resource scope of the cloud network. The resource scope may refer to an overall implementation of resources in the network including dependencies between resources and scope of security protections. The method may further include steps performed by a compliance system in the cloud network including receiving a request to provision a new resource in the cloud network and initiating a pre-provisioning evaluation of the new resource prior to provisioning the new protocol in the cloud network. The step of initiating the pre-provisioning evaluation may further include steps for duplicating the current resource scope in the current execution timeline to an alternate resource scope in an alternate execution timeline and providing provisioning data associated with the new protocol, wherein the provisioning data comprises information to provision the new protocol in the cloud network. The method then may run the new protocol on the alternate resource scope in the alternate execution timeline and collect a result of running the new protocol on the alternate resource scope.

Several embodiments are also directed to computer-implemented methods for improving protocol compliance in a cloud network by performing both a pre-provisioning check of a new protocol and a post-provisioning check of an implemented protocol. The methods may include the use of an immutable database for maintaining timelines of events for performing the pre-provisioning and post-provisioning checks. Steps may include maintaining, in the immutable database, a state of the cloud network on a current execution timeline. The current execution timeline may be a time-ordered data series of a history of transactions which are associated with a user financial account and the history of transactions includes transactions previously processed by the cloud network up to a current date. Steps for performing the pre-provisioning check of the new protocol may further include receiving provisioning information associated with provisioning the new protocol in the cloud network, generating an alternate transaction based on the provisioning information, and determining whether to provision the new protocol based on an evaluation of the alternate transaction. Steps for performing the post-provisioning check of the current protocol by receiving a modification to the current protocol, generating a second alternate transaction based on the modification to the current protocol, and determining whether to provisioning the modification to the current protocol based on a second evaluation of the second alternate transaction.

DETAILED DESCRIPTION

Embodiments disclosed herein relate to improving cloud protocol compliance in a cloud network, which includes a compliance system for testing new protocols. The compliance system may include a number of components for performing the pre-provisioning check including a maintenance module, a collection module, and an evaluation module, which work together to evaluate the resource prior to its deployment in the cloud-based environment. The components may utilize bitemporal analysis to evaluate the resource in an execution timeline in order to evaluate the potential effects of the resource. Bitemporal analysis refers to the use of at least two timelines of transactions as an overall representation of the status of the network environment. Resources may include protocols or security controls in the cloud-based network.

Embodiments disclosed herein relate to systems and methods for performing the bitemporal analysis of resources and transactions on various processing timelines using an immutable database with time-based features for processing data. The claimed disclosure is not limited to an immutable database and other systems or databases may be utilized for implementing multiple timelines for storing transactions within a network environment. In certain embodiments, the immutable database may be implemented in any system in which transactions (or events) are received by the system and contribute to an overall status of the system. The systems and methods disclosed herein implement an immutable database that stores all transactions received by the system in which the database is implemented and maintains a current view of the system based on the received transactions. The immutable database as described herein in various embodiments may be implemented in any system where transactions (or events) are recorded. Non-limiting examples of a system include a financial system that maintains user financial accounts or a cloud-based resource provisioning system in which resources are provisioned in compliance with protocols (or policies) of the provisioning system.

The immutable database as described herein in various embodiments may be implemented in any system where transactions (or events) are recorded. Non-limiting examples of a system include a financial system that maintains user financial accounts or a cloud-based resource provisioning system in which resources are provisioned in compliance with protocols (or policies) of the provisioning system.

The immutable database of the present disclosure may be configured to store all transactions received by the system in which it is implemented and prevents any transactions from being overwritten. The term "transactions" referred to herein may include an event that affects a state or states of the system in which the immutable database is implemented. Transactions may vary in type based on the system. For example, in a resource provisioning system, transactions may be implemented as events in the system associated with the resources or protocols (such as requests to provision a new resource, to modify an existing resource, to implement a new policy, or to modify an existing policy). As another example, in a financial system, transactions may be implemented as account transactions (such as withdrawals, deposits, late fees, overdraft charges) that impact the balance of an account in a financial system. Transactions may also be associated with specific accounts in the financial system.

The term "state" referred to herein may include data about the system including its operating condition (e.g., whether components in the system are running, whether there are any run-time errors). As an example, if the immutable database is implemented in a financial system, the immutable database may store transactions associated with different financial accounts maintained by the financial system. The "state" of a financial account in the financial system may refer to a balance of a financial account maintained by the financial system. In this manner, the immutable database may store states corresponding to different components (i.e., financial accounts) in the system in which it is implemented. As another example, if the immutable database is implemented in a resource provisioning system, the immutable database may store events associated with different components (e.g., resources, policies/protocols) in the system. The "state" of the resource provisioning system may therefore refer to an operating condition of the system based on the implemented components. In this manner, the immutable database may provide insight into how changes to components may impact the state of the system such as how changes to resources or protocols may impact the operating condition of the resource provisioning system.

A beneficial aspect of the immutable database is the capability to store all transactions in a timeline which allows for a variety of time-based operations to be performed. Accordingly, the term "state" may refer to a particular moment in time. A "state" may include a "current state" of the system or a "prior state" of the system. A "current state" referred to herein may include the status of the system as of the time a transaction is received by the system. A "prior state" referred to herein may include the status of the system at any point in time prior to the "current state" of the system.

The term "timeline" referred to herein is a time-ordered data series or sequence that provides a view of transactions in a time-based sequence. The sequence that the transactions are stored may be based on metadata associated with the transactions (e.g., a time that the transactions were created, a time that the transactions are valid) or based on when the transactions were received and processed. In addition to storing the transactions, the timeline may also include information about the state of the system after receipt of each transaction. In this manner, the timeline also reflects how the state of the system (or components within the system) is changed after each transaction.

In several embodiments, the transactions may be associated with a particular component and may interact with each other to impact a current state of that particular component. Examples of a component of a system include financial accounts (in a financial system) and resources or protocols (in a resource provisioning system). Transactions that contribute to the current state maintained by the immutable database may be reflected on a timeline associated with that component to indicate the sequential processing of the transactions as they were received by the immutable database. In several embodiments, the immutable database may generate separate timelines for each component in the system. For example, the immutable database may generate separate timelines for each financial account in a financial system with each timeline providing a current state (e.g., a balance) of each financial account.

The immutable database can store transactions along multiple timelines including a current timeline that reflects the transactions that were applied to arrive at the current state of the system as well as any number of alternate timelines. That is, the term "timeline" can include a "current timeline" and an "alternate timeline." A "current timeline" is a time-ordered data series of transactions that were processed to determine the current state of the system. An "alternate timeline" is also a time-ordered data series but includes one or more potential or hypothetical transactions and that contribute to an alternate state of the system. An alternate state differs from the current state of the system in that the alternate state is a potential state (i.e., not the actual) of the system where the current state of the system reflects the actual state of the system at a moment in time.

The generation of alternate timelines allow the immutable database to provide insight into how changes to already processed transactions (or events) in the system could affect the current state of the system. Because alternate states of alternate timelines are separate from the current (actual) state of the system, proposed changes to the system (e.g., different transactions, new transactions, modified transactions) can be evaluated in a safe manner without impacting actual operation of the system. Moreover, because transactions are stored in a time-ordered sequence, proposed changes to transactions can be implemented at any particular time along the current timeline. This allows the proposed changes to be tested based on the current state of the system as of that particular time, which allows for an accurate comparison between the proposed change (in the alternate timeline) and the actual transaction (in the current timeline).

Testing the proposed changes allows the system to determine the effect of the proposed changes and whether the proposed changes should be implemented into the current timeline. In this manner, the immutable database may allow transactions of an alternate timeline to be promoted or incorporated into the current timeline to replace corresponding transactions in the current timeline.

In several embodiments, the systems and methods disclosed herein may achieve the current and alternate timelines through the use of a bitemporal ledger which stores all transactions received by the system (e.g., by appending new transactions in order) and storing transactions with temporal metadata which indicates the time (or date) on which transactions were both created and are valid and effective. Timelines may be generated based on the transactions that are available in the bitemporal ledger and using the temporal data to identify where transactions should be implemented in a timeline.

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claim section below, the module or unit is deemed to include hardware circuitry for the purposes and the scope of the system or apparatus claims.

The term "service" or "services" referred to herein can include a collection of modules or units. A collection of modules or units may be arranged, for example, in software or hardware libraries or development kits in embodiments of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface (API) to facilitate the execution of functions of the system.

The modules, units, or services in the following description of the embodiments may be coupled to one another as described or as shown. The coupling may be direct or indirect, without or with intervening items between coupled modules, units, or services. The coupling may be by physical contact or by communication between modules, units, or services.

Overview of Systems and Features

FIG. 1 is a block diagram of an immutable database 100, according to some embodiments. Immutable database 100 may include one or more components for storing all transactions received by the system in which it is implemented (and prevents any transactions from being overwritten). Immutable database 100 may also include one or more components for maintaining transactions in a timeline that provides a view of the transactions in a time-ordered sequence in which they were received by the immutable database 100.

Immutable database 100 may be implemented in any system that processes transactions that affect a state of the system. As a non-limiting example, immutable database 100 may be implemented as a memory with an immutable data structure where data may be appended to already stored data. As another non-limiting example, immutable database 100 may be implemented as a distributed data store comprising a write-ahead log, object storage, block storage, and a key-value store as will be discussed with respect to FIG. 5.

As a non-limiting example of implementation, immutable database 100 may be implemented within a financial system that stores multiple user financial accounts such as checking or savings accounts. In this example, the multiple user financial accounts represent different components of the financial system that are maintained by the immutable database 100. Transactions received by immutable database 100 may be financial transactions (such as a withdrawal or deposit) associated with one or more of the user financial accounts of the financial system. The transactions associated with a particular user financial account may interact with each other to impact a balance of that user financial account. In this example, the current timeline associated with the user financial account reflects the sequence of transactions as they were received by immutable database 100 and the transactions may affect the balance of a user financial account. Transactions such as withdrawals or deposits are processed in the order received to ensure that the balance (i.e., the current state) of a user financial account accurately reflects the correct amount based on the withdrawals and deposits as they occurred. Processing them out of order would likely result in an incorrect balance or an incorrect state of the financial account.

In several embodiments, immutable database 100 may include a processing engine 102, a datastore 110, a control plane 116, a data stream manager 120, and query manager 122. In several embodiments, processing engine 102 may further include a dispatcher 104, product plug-ins 106a-n, and modules 108a-n. In several embodiments, datastore 110 may further include a bitemporal ledger 112 and a key-value store 114.

Processing engine 102 may communicate with and receive transactions from a data stream manager 120. In several embodiments, data stream manager 120 may implement a transaction stream for buffering transactions as they are received from devices in the enterprise system. The transaction stream may be implemented as a durable stream from which the data stream manager 120 may transmit the transactions as they are received to the processing engine 102 for processing. Data stream manager 120 may transmit the transactions in the order received so that each transaction is processed in the correct order. In some embodiments where processing of the transactions impacts a current state or states maintained by the immutable database 100, processing each transaction in order may be important to ensure that the current state of the system accurately reflects all transactions.

Data stream manager 120 may create a data stream (also called a graph) and associate a data stream identifier with the created data stream. In some embodiments, data stream manager 120 may create any number of data streams to process transactions associated with different components of the system, such as a user financial account. A data stream stores received transactions associated with a corresponding component. For example, the data stream identifier may be a user financial account identifier that uniquely identifies each financial account.

Processing engine 102 may include a dispatcher 104 which may assist in managing the processing of transactions as they are provided by data stream manager 120. Dispatcher 104 ensures that transactions are accurately mapped to their corresponding nodes and that the current state of each node is accurately updated based on those transactions. In several embodiments, transactions include an identifier corresponding to the node such as a data stream identifier that identifies a data stream associated with the node or a node identifier. Dispatcher 104 may generate a worker process that is associated with the node and/or the data stream identified by the identifier. The worker process may then manage the processing of each transaction within the data stream for the node. In several embodiments, there is a one-to-one ratio between the number of worker processes generated by dispatcher 104 and the number of accounts maintained by the immutable database 100 and each generated worker only processes transactions for its corresponding node. The worker process may ensure that commands in the data stream for each node are processed in the order that they are received and so it may accurately update the current state of the node based on that processing.

Processing engine 102 may further include any number of product plug-ins 106a-n and modules 108a-n. Product plug-ins 106a-n may be implemented as handlers for processing commands, events, and messages that are associated with received transactions. Dispatcher 104 may be responsible for managing the operations of each of product plug-ins 106a-n. For example, product plug-in 106a may be implemented as a command handler, product plug-in 106b may be implemented as an event handler, and product plug-in 106n may be implemented as a message handler. Product plug-in 106a may be responsible for inspecting transactions for validity and generating an event based on the inspection. In several embodiments, product plug-in 106a may call one or more modules from modules 108a-n to perform functions associated with the generated event. Product plug-in 106b may receive the event and call a module for processing the module based on the generated event. If the transaction is determined to be valid, the corresponding event indicates that the transaction is ready for processing. In several embodiments, product plug-in 106b may call one or more modules from modules 108a-n to perform functions associated with the generated event. Conversely, if the transaction is determined not to be valid (e.g., improper format, unrecognized identifiers), the corresponding event may indicate an error. Product plug-in 106c may be responsible for handling such error messages by calling one or more modules from modules 108a-n to perform the functions associated with the error messages.

Modules 108a-n may be responsible for performing business logic in a bounded manner which increases the security of execution. Modules 108a-n may be configured for bidirectional communication with the processing engine 102. Each module of modules 108a-n may be configured to perform a different function as needed to process transactions by processing engine 102. For example, there may be a module that can be called by processing engine 102 via a product plug-in of product plug-ins 106a-n that is responsible for processing specific kinds of transactions or queries.

Control plane 116 may be configured as a central repository for both product plug-ins 106a-n and modules 108a-n, and may provide both when called by dispatcher 104 for processing transactions or executing other functions needed by processing engine 102. Control plane 116 may provide a subscribe interface so that processing engine 102 may subscribe to any changes or new releases associated with product plug-ins 106a-n and modules 108a-n. Control plane 116 may also be configured as a discovery service for the bitemporal ledger 112 and key-value store 114 for deploying services or other products by the processing engine 102.

Datastore 110 may store all relevant information including processed transactions, the current state or states maintained by immutable database 100, and current timeline or timelines representing the different sequences of transactions processed by processing engine 102. Datastore 110 may include bitemporal ledger 112 and key-value store 114.

Bitemporal ledger 112 may be implemented as an asynchronous data stream for asynchronously receiving transactions from processing engine 102 and without the processing engine 102 having to wait for an acknowledgement from bitemporal ledger 112. Processing engine 102 may therefore process the next transaction received from the data stream manager 120. Bitemporal ledger 112 may store transactions as they are processed by processing engine 102. In several embodiments, transactions are prevented from being overwritten by configuring the bitemporal ledger 112 as an event store that only allows appending new data into the store. Appending new transactions as entries into bitemporal ledger 112 allows the transactions to be processed sequentially and ensures that transactions are added without overwriting any existing transactions.

In such embodiments, bitemporal ledger 112 may store the transactions in cryptographically verifiable log files with each transaction being stored as a data entry within the log file. Each transaction may be stored so that it is cryptographically verifiable to allow for each entry in the log file to be verified as authentic and accurate. An example of a log file is a write-ahead log file which employs a log that first records the transaction before being written to more stable storage such as object or block storage.

Because transactions are stored in a time-ordered manner along a timeline, bitemporal ledger 112 utilizes temporal metadata to identify the particular time in the timeline in which transactions are to be applied. Bitemporal ledger 112 stores each transaction with their temporal metadata which defines certain time-related information associated with the transaction. In several embodiments, the temporal metadata includes a "created at" time and a "valid from" time. As used herein, the term "time" can refer to a date (e.g., February 7), a time (e.g., 12:00 pm) or a combination thereof. In several embodiments, the "created at" time refers to the time when the transaction is created and the "valid from" time refers to the time when the transaction is to take effect. Bitemporal ledger 112 allows for a transaction to have different "created at" and "valid from" times. The ability to have different times for when a transaction is created and for when it is to be effective allows bitemporal ledger 112 to provide alternate timelines. Bitemporal ledger 112 may generate an alternate timeline (different from the current timeline) based on the "valid from" times of transactions.

In several embodiments, bitemporal ledger 112 may receive transactions and store them in a current timeline in a time-ordered sequence. The time-ordered sequence may be determined based on any number of factors including the time when the transactions are received, the time when the transactions were processed, or based on the temporal metadata associated with each transaction (e.g., based on the "valid from" times). Bitemporal ledger 112 may determine whether transactions are to be implemented on the current timeline, and therefore impact the current state of the system, or on an alternate timeline for further evaluation. Implementation of timelines is discussed in further detail with regard to FIGS. 3A-B.

Figure 4A:
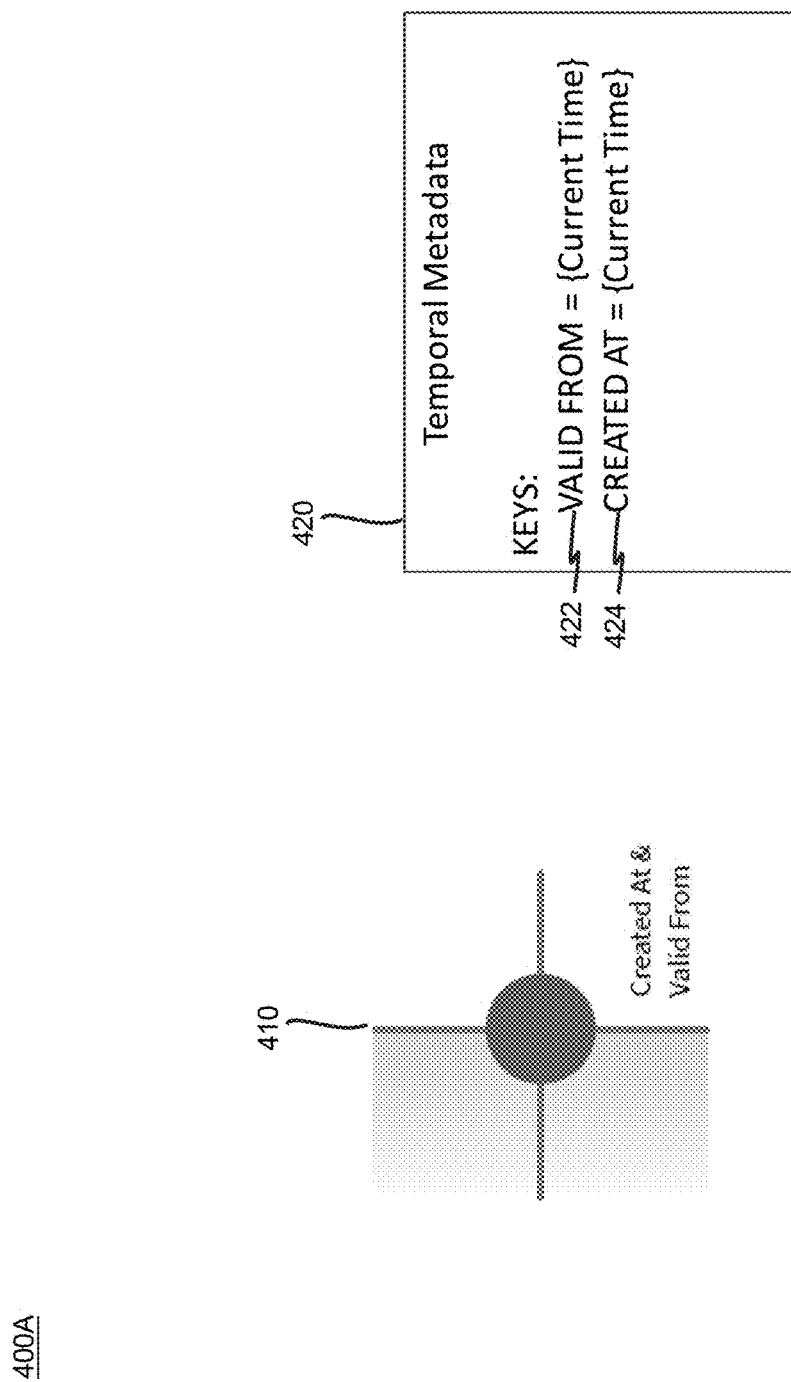
FIGS. 4A-C are exemplary entries in a bitemporal timeline created by an immutable database, according to some embodiments.
Figure 4B:
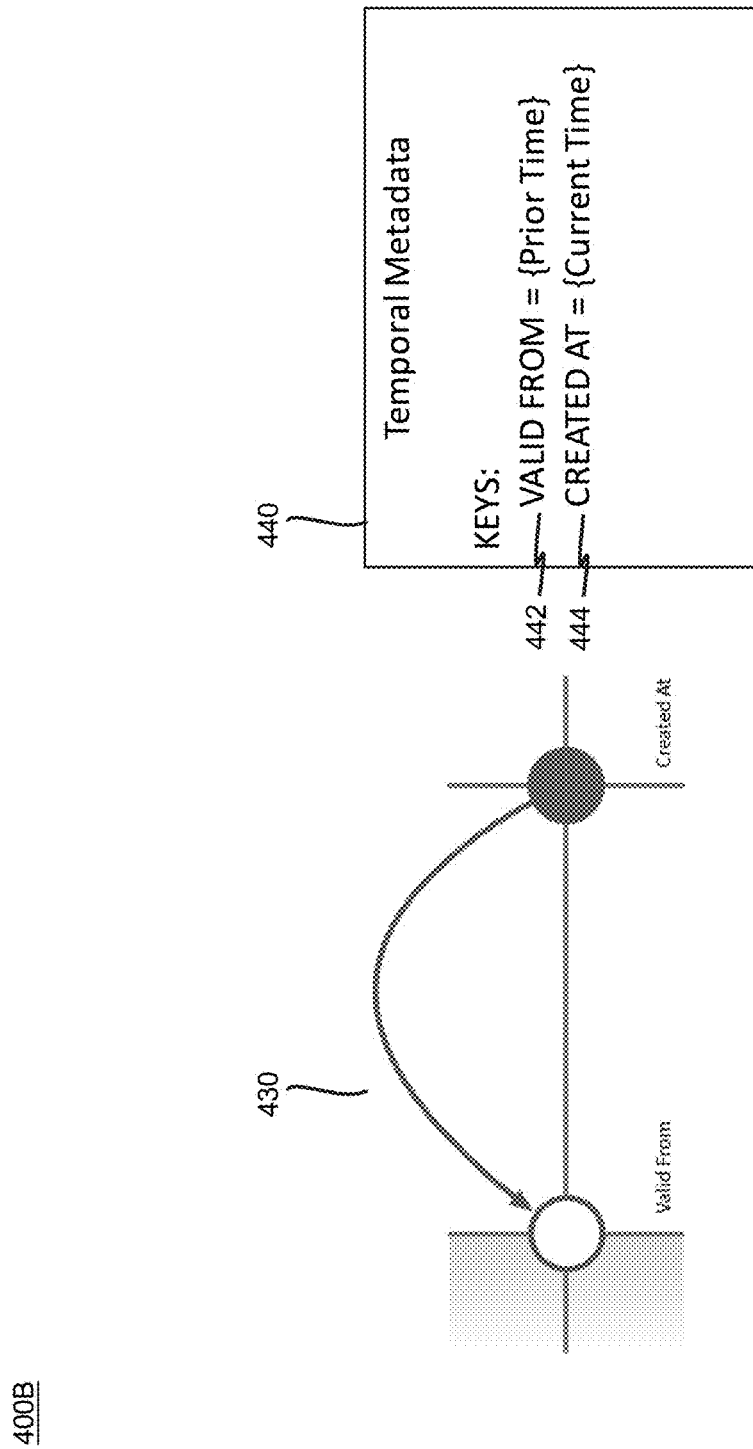
Figure 4C:
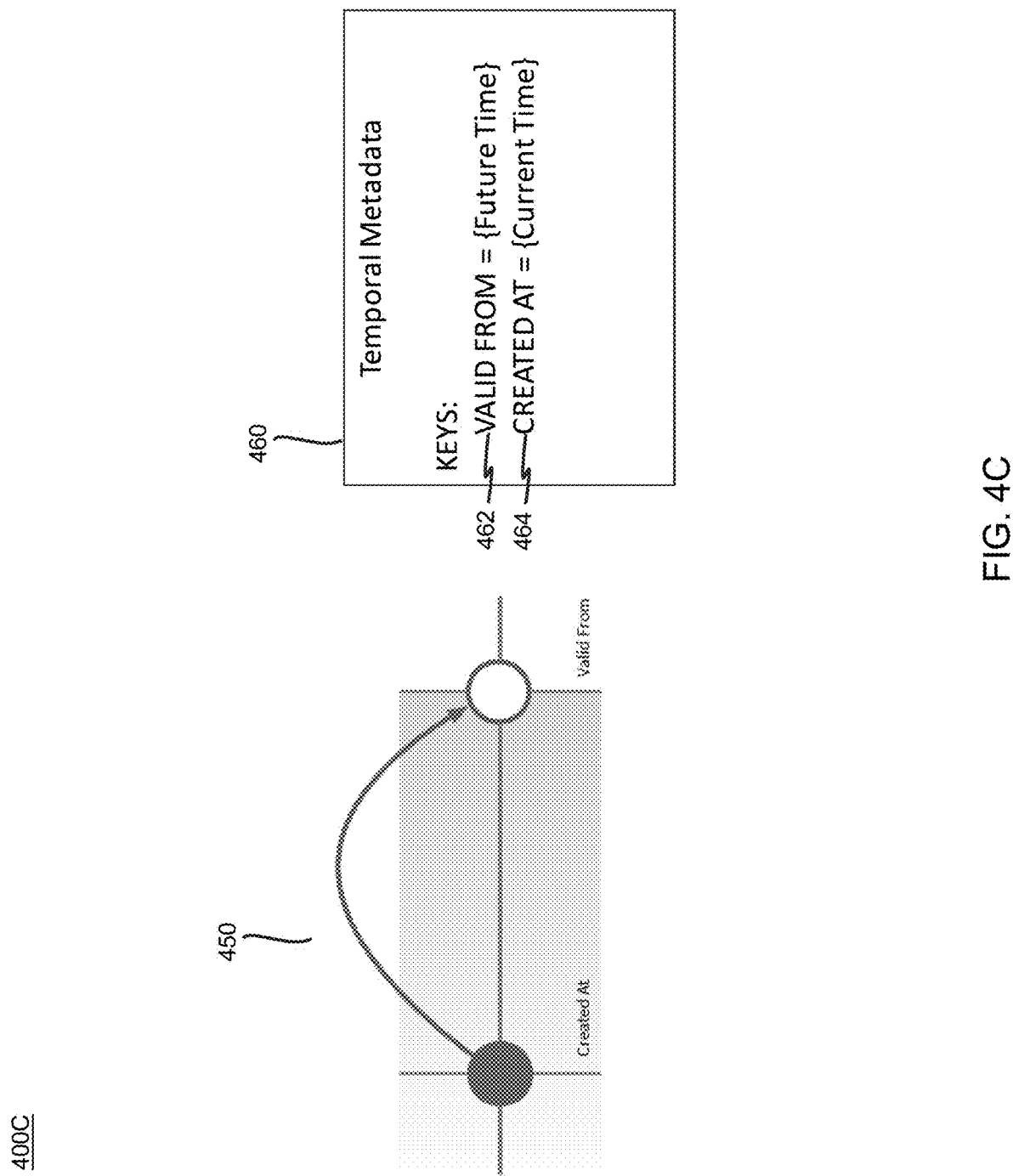

In several embodiments, there are different types of transactions that are defined based on temporal metadata associated with each transaction. Each of the types of transactions can be stored as entries in a timeline by bitemporal ledger 112. FIGS. 4A-C are exemplary entries in a bitemporal timeline that describe different types of transactions, according to some embodiments.

FIG. 4A depicts an entry 400A of a timeline maintained by immutable database 100. Entry 400A may include a classic transaction 410 and temporal metadata 420 associated with the classic transaction 410. A classic transaction 410 may be defined by temporal metadata 420 that includes a "valid from" time 422 that matches the "created at" time 424. For example, the "created at" time 424 may indicate that the classic transaction 410 is created at a current time (e.g., June 5) and the "valid from" time may indicate that the classic transaction is valid as of the same current time. An example of a classic transaction in the context of a financial system is a withdrawal or deposit by a user from the user's financial account. A withdrawal transaction by a user may be created as of the current time that the withdrawal from the financial account takes place and may be valid as of that current time as well. This means that the withdrawal transaction impacts the current state (e.g., balance) of the financial account as of the current time (e.g., "valid from" time) by reducing the amount in the account by the amount of the withdrawal transaction. An example of a classic transaction in the context of a resource provisioning system is the provisioning of a resource that occurs at the same time as the request to provision that resource.

FIG. 4B depicts an entry 400B of a timeline maintained by immutable database 100. Entry 400B may include a retroactive transaction 430 and temporal metadata 440 associated with the retroactive transaction 430. The term "retroactive transaction" refers to a transaction that has an impact that is to be applied retroactively with respect to the current time and/or the "created from" time of that transaction. A retroactive transaction 430 may be defined by temporal metadata 440 that includes a "valid from" time 442 that is prior to a "created at" time 444. In other words, the retroactive transaction 430 is valid as of a time that is prior to the current time (e.g., one week prior to the current time) as indicated by the "created from" time 444. An example of a retroactive transaction is a correcting transaction created by a financial institution (e.g., bank) that manages the user's financial account. In some embodiments, the retroactive transaction is meant to correct or replace an incorrect classic transaction that has already been recorded on the timeline by bitemporal ledger 112.

Consider the following examples of a classic transaction 410 and a retroactive transaction 430 in the context of generating timelines. In a non-limiting example, classic transaction 410 may have a "created at" time 422 of June 1 and a "valid from" time 424 of June 1 and retroactive transaction 430 may have a "created at" time 422 of June 10 and a "valid from" time 444 of June 1. In this example, the financial institution may have noticed that the classic transaction 410 was incorrect and issues a retroactive transaction 430 on June 10 to correct the classic transaction 410. Accordingly, the retroactive transaction 430 is created with a "valid from" time 444 that applies retroactively from the time that the retroactive transaction 430 is created and with the correct information of the transaction (e.g., amount). Bitemporal ledger 112 may then generate an alternate timeline based on the retroactive transaction 430 and the temporal metadata 440. Timelines are discussed in further detail with respect to FIGS. 3A-B.

Temporal metadata 440 may also include information identifying the classic transaction 410 that the retroactive transaction 430 is intended to correct. This information may include an identifier of the classic transaction 410.

FIG. 4C depicts entry 400C of a timeline maintained by immutable database 100. Entry 400C may include a scheduled transaction 450 and temporal metadata 460 associated with the scheduled transaction 450. Temporal metadata 460 includes a "valid from" time 462 indicating that the scheduled transaction is valid as of a future time and a "created at" time 464 indicating that the classic transaction 410 is created at the current time. An example of a scheduled transaction is a scheduled withdrawal or scheduled deposit by a user from the user's financial account. A scheduled withdrawal transaction by a user is created as of the current time and is valid as of a time in the future relative to the current time. This means that the scheduled withdrawal transaction does not impact the current state (i.e., balance) of the financial account until the future time (i.e., "valid from" time).

Returning to FIG. 1, key-value store 114 stores information that may be queried. The key-value store 114 may store temporal metadata associated with the entries in the timeline as values and includes a key to the corresponding entry. Storing the temporal metadata in this manner allows for bitemporal ledger to quickly respond to queries that may involve particular times. Key-value store 114 may also store current state information of each node.

Query manager 122 may receive and initiate processing of queries. Queries differ from transactions. Where transactions represent actual events (e.g., actual withdrawals or deposits) that impact the current state or states (e.g., account balances) maintained by immutable database 100, queries may represent requests to retrieve the current state or states or may include alternate events to change the current state or states. Non-limiting examples of alternate events include a retroactive correction to a past transaction or a scheduled transaction to occur sometime in the future beyond the current state.

Consider the following to illustrate this difference. Continuing the non-limiting example, immutable database 100 may manage a user financial account and maintain a current balance (i.e., a current state) of the user financial account as of the current time. This current balance reflects the interaction of a number of prior actual transactions (e.g., withdrawals and deposits) that occurred sequentially and prior to the current time. The sequential processing of these prior actual transactions may be reflected as a current timeline associated with the user financial account. For example, at the current time, the enterprise system in which immutable database 100 is implemented receives a query regarding a prior actual transaction that occurred a certain time period (e.g., one month) prior to the current time. The query may indicate the prior actual transaction (e.g., by date or transaction identifier), the user account associated with the prior actual transaction, and a request to apply a retroactive correction to the prior actual transaction. For example, the prior actual transaction may indicate a withdrawal of $100 dollars from the user account and the retroactive correction may indicate that the transaction should be correct to reflect a withdrawal of $120. The retroactive correction to be applied to the user financial account is an alternate transaction since it is not currently reflected in the current balance of the user financial account.

Query manager 122 may enable different types of queries for requesting information associated with accounts maintained by the immutable database 100 such as retrieving a state of accounts at any point in time up to the current date and time, retrieving a current stream of transactions associated with a current timeline, retrieving alternate streams of transactions associated with alternate timelines that were previously generated in response to past queries, a subset of transactions within a stream of transactions that were created subsequent to a particular transaction. Immutable database 100 is capable of providing these features because it maintains all transactions that are processed (including current and alternate timelines) and prevents any overwrites of transactions and data that are stored, and also because it stores entries using temporal metadata which allows for time-related queries of entries stored in the immutable database 100.

Figure 2:
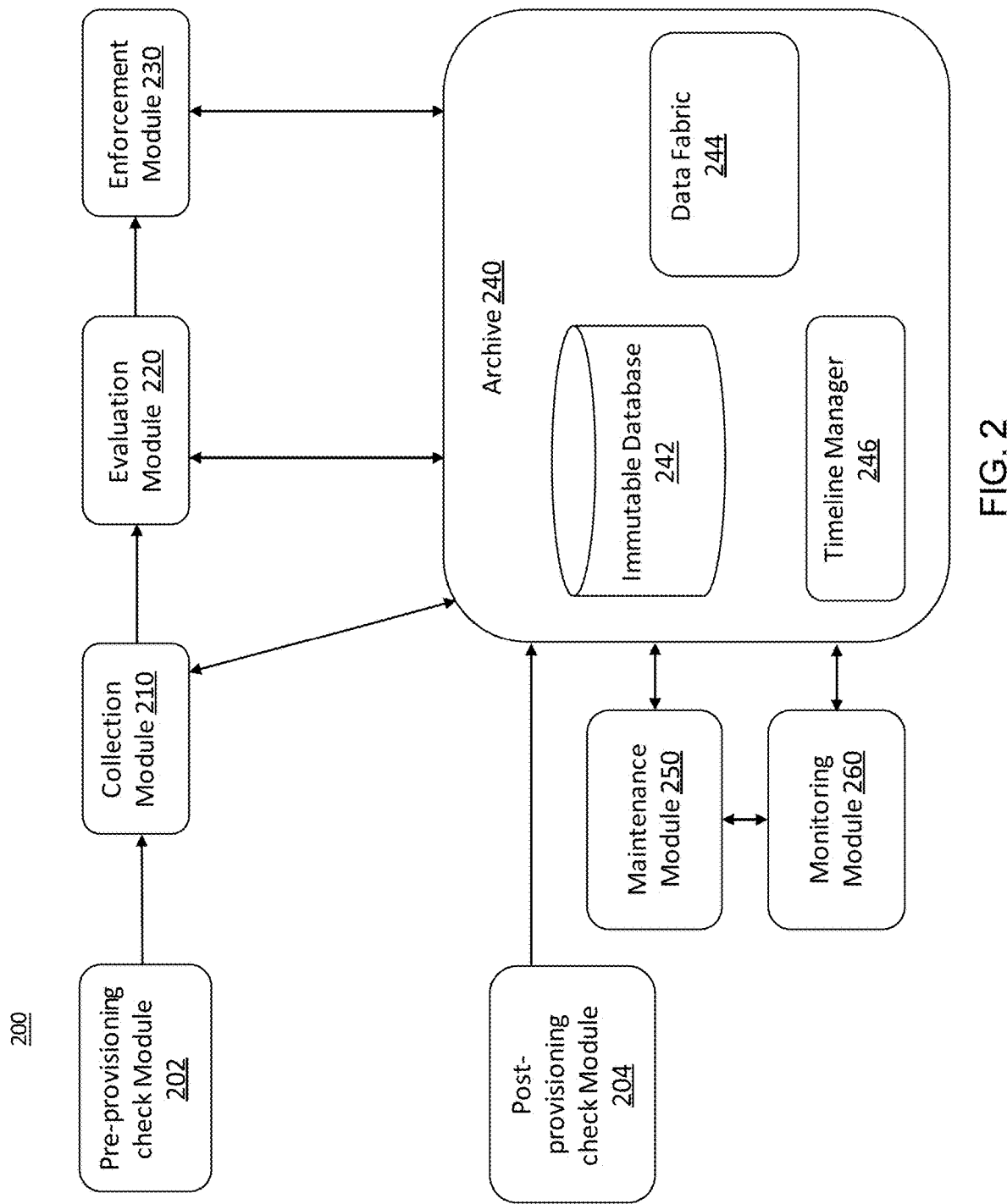
FIG. 2 is a block diagram of a resource provisioning system implementing an immutable database to perform pre-provisioning and post-provisioning checks, according to some embodiments.

FIG. 2 is a block diagram of an enterprise system 200 implementing an immutable database to perform pre-provisioning and post-provisioning checks, according to some embodiments. Enterprise system 200 may be any system which provisions resources but also requires the resources to comply with protocols of the enterprise system 200. Enterprise system 200 includes an archive 240 that implements immutable database 242 that allows for resources to be checked both prior to and after provisioning within enterprise system 200. In some embodiments, immutable database 242 is similar to immutable database 100 discussed with respect to FIG. 1. In some embodiments, immutable database 242 may be an extended configuration of immutable database 100 that includes additional or alternative functionality.

One example of enterprise system 200 is a cloud environment system that provides access to cloud resources via different protocols. A cloud environment system benefits from the features described herein because of the variety of users that may interact with the cloud environment system in a distributed manner including authors of protocols, developers who provision resources, and auditors or regulators who inspect or verify compliance of the protocols and the current state of the cloud environment system. A cloud environment system also includes a number of types of protocols including governance, cyber, and architecture with which resources in the system must comply.

Enterprise system 200 allows both pre- and post-provisioning checks on resources based on any changes to the enterprise system 200 such as changes to protocols within the enterprise system 200. For example, enterprise system 200 may receive transactions which represent requested changes to protocols or resources in the enterprise system. Employing immutable database 242 in enterprise system 200 and the capability to generate alternate timelines representing current states of nodes based on retroactive or scheduled transactions provides a number of benefits, which include performing pre-provisioning checks of resources before they are deployed, testing new or changed protocols and their effect on currently or previously provisioned resources, providing query capability that allows auditors and regulators is to accurately ascertain precisely what protocols or resources (i.e., a current state of nodes) were in effect at a given moment in a prior time, providing a permanent record of protocols and resources and their enforcement.

The benefits described above stem from the immutable database 242 being capable of generating alternate views or timelines that accurately represent a current state of the enterprise system. Within these alternate timelines, alternate transactions (e.g., a proposed resource, a proposed change to a policy) may be tested to identify their potential effect on the state of the enterprise system 200. The alternate timelines are a complete and full representation of the enterprise system 200 for a predetermined period of time, which allows potential changes to be tested and the corresponding results to be viewed with confidence as results to the enterprise system 200. The results may then be analyzed to determine whether the changes should be implemented in the enterprise system 200.

In some embodiments, the alternate timeline may be utilized to represent a hypothetical situation based on past events. As a non-limiting example, the alternate timeline may be used to test a new or modified policy created to prevent instances of a past problem in enterprise system 200 such as an outage caused by insufficient provisioned resources in the enterprise system 200. A new policy may be generated to prevent that error from occurring again. To check the efficacy of the new policy, an alternate timeline may be generated to evaluate the provisioning request that caused the error (e.g. outage due to insufficient resources). The alternate timeline may represent the same execution state that was in place when the error occurred but with the new policy replacing the old policy. Executing the alternate timeline for the new policy allows the new policy to be tested as to whether it will flag the error. If it does, then the new policy is effective and may be implemented in the enterprise system 200 to prevent future errors. If not, the new policy may be further revised.

The proposed change (in the form of a received transaction) to the enterprise system 200 may include separate components for receiving pre-provisioning and post-provisioning checks. For example, enterprise system 200 may include a pre-provisioning check module 202 and/or a post-provisioning check module 204, each of which may receive requests for performing a check as to whether the proposed changes comply with protocols of the enterprise system 200. A pre-provisioning check occurs prior to the resources being provisioned in the enterprise system 200 and a post-provisioning check occurs on resources that have already been provisioned in the enterprise system 200. Pre-provisioning check module 202 may initiate upon a request from a user to provision a resource. Pre-provisioning check module 202 may then proactively initiate an action to inspect the resource and either allow or prevent the launch of any resources based on their compliance with the protocols of the enterprise system 200. Post-provisioning check module 204 may initiated a post-provisioning check on a resource upon a change in a protocol (or policy) that affect that resource, a change in the infrastructure of the enterprise system 200 (e.g., when new components are added to the system), or a change in the resource itself.

In several embodiments, enterprise system 200 may include collection module 210, evaluation module 220, enforcement module 230, archive 240, maintenance module 250, and monitoring module 260. The modules will first be discussed in the context of the execution path of the pre-provisioning check module 202 which may be initiated with a transaction or event such as a request to provision a new resource or policy in enterprise system 200.

In several embodiments, protocols control operations of the enterprise system 200. These operations may include how resources are to be provisioned or utilized within enterprise system 200. There may be any number of protocols in enterprise system 200, with each policy containing one or more rules. Non-limiting examples of protocols include protocols for creating tasks, calling programs such as application programming interfaces (API), defining access privileges associated with resources in the enterprise system 200 such as who may have access to certain resources and what type of access resources have to other resources, defining security protocols for components or modules within the enterprise system 200, just to name a few examples.

The first step in the execution path through the pre-provisioning check module 202 is collection module 210. The purpose of collection module 210 is to prepare a brief (or data file) that includes all relevant information about enterprise system 200 that is needed to perform the pre-provisioning check by pre-provisioning check module 202 for the requested transaction or at least an access method for accessing the relevant information. In the context of a resource provisioning environment, this relevant information can include the current state of the enterprise system such as the security protocols that govern the transaction and already implemented resources that are related to the transaction. The data file is to be provided to the evaluation module 220 and contains either the actual relevant information that the evaluation module 220 will require, or an access method for that data. The data file is also provided to the archive 240 to be stored as a transaction to be stored in a current timeline of the enterprise system. The data file may be stored as an entry in the timeline.

For example, if a policy governs a resource, then there is a dependency between the policy and the resource. There may be a number of dependencies between the protocols and resources within enterprise system 200. That is, a single policy change could result in hundreds or thousands of individual actions to be undertaken in enterprise system 200 based on the dependencies on that policy including the scope of the policy, the number of resources to which the policy applies and the complexity of the actions resulting from the policy enforcement. Accordingly, policies may potentially involve actions on thousands or even millions of entities and some scopes have several hundred thousand entities to whom protocols might apply.

The data file containing the relevant information generated by the collection module 210 identifies the protocols and resources associated with the transaction based on these dependencies. Other information that may be included in the data file includes scopes, applicable exceptions, and operational condition of the enterprise system 200. As an example, if a pre-provisioning check is being performed on a transaction involving a change to a security policy in the enterprise system 200, collection module 210 will identify all other protocols and resources dependent on the security policy and include the identified protocols and resources in the data file.

As will be discussed later, the collection module 210 is also on the execution path for performing post-provisioning checks and performs a similar role in the process. Collection module 210 provides the data file along with the transaction or the proposed changes to evaluation module 220 for evaluation.

Evaluation module 220 is responsible for determining whether applying the transaction to the enterprise system 200 is compliant with the protocols of the enterprise system. This determination includes testing the transaction using the identified protocols and resources provided in the data file. In several embodiments, testing the transaction involves evaluation module 220 generating an alternate timeline or time-ordered data series to determine the effect of applying the transaction without actually requiring the transaction to be implemented in enterprise system 200. The evaluation module 220 provides information, received from collection module 210, to archive 240 and the immutable database 242 which are responsible for generating the alternate timeline, which may store a current timeline representing the current state of the enterprise system 200 as of the time the transaction is received. The evaluation module 220 may then evaluate the policy and protocols based on the data provided by the collection module 210. In embodiments that involve generation and modification of an alternate timeline, the data includes labels that indicate that it is directed to the alternate timeline so that it is not utilized in the current timeline. In several embodiments, the current state of the enterprise system 200 is represented by the protocols and resources that are currently installed and/or provisioned within the enterprise system 200. These protocols and resources may be represented as separate entries along the current timeline with the entries defined by the time in which each policy and resource was applied to the enterprise system 200.

The alternate timeline is a duplicate of the current timeline as of the time that a transaction is received by the enterprise system 200. The relevant protocols and resources included in the data file may be the protocols and resources of the current timeline that are duplicated into the alternate timeline. By duplicating the current timeline at the time the transaction is received, the alternate timeline includes all of the relevant protocols and resources of enterprise system 200 needed to apply the transaction to achieve a result that would mirror applying the transaction to the current timeline. In some embodiments, the alternate timeline is virtually duplicated and remains virtual until the alternate timeline is promoted to the current timeline to prevent the alternate timeline from making any changes to the current timeline. When the alternate timeline is promoted, then the transactions in the alternate timeline take effect. Pre-provisioning check module 202 involves the evaluation module 220 applying the transaction to the alternate timeline and evaluating the result of that application. The alternate timeline is separate from the current timeline so that testing the transaction does not affect the current state of the enterprise system 200. The result of applying the transaction to the alternate timeline is an alternate state of the enterprise system 200. The alternate state may represent an operating condition of the relevant protocols and resources after the transaction has been applied. In contrast to the current state represented by the current timeline, the alternate state represents a hypothetical state of the enterprise system 200. Examples of state include the operating condition of the relevant protocols or resources or the operating condition of the enterprise system 200, where the operating condition may indicate that there are no conflicts between protocols, that protocols are operating as normal, that there was an error in one or more of the protocols, or that there was an error in the enterprise system 200.

Figure 3A:
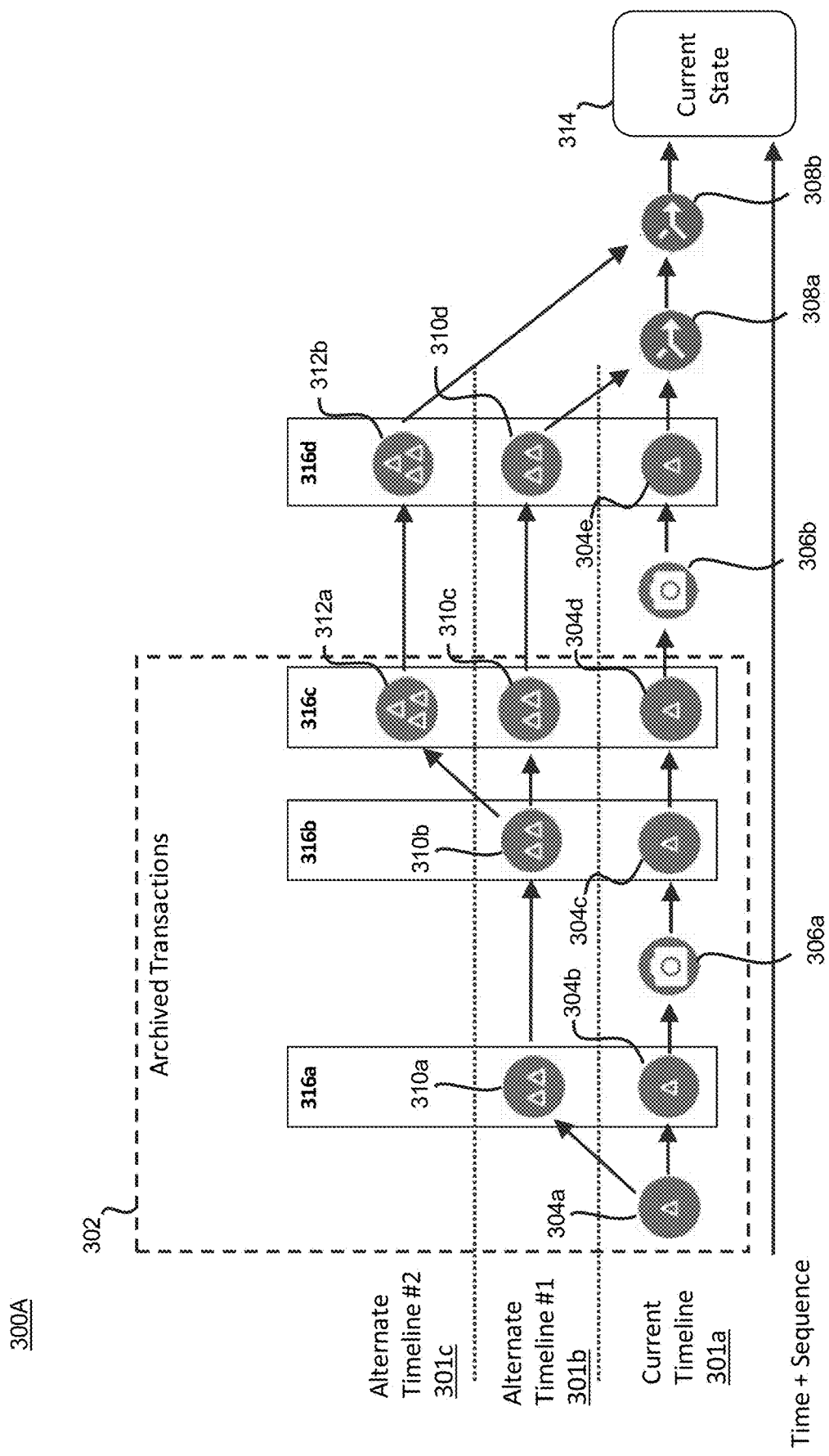
FIGS. 3A-3B are flow diagrams illustrating an electronic journal with different timelines created by an immutable database for processing transactions, according to some embodiments.
Figure 3B:
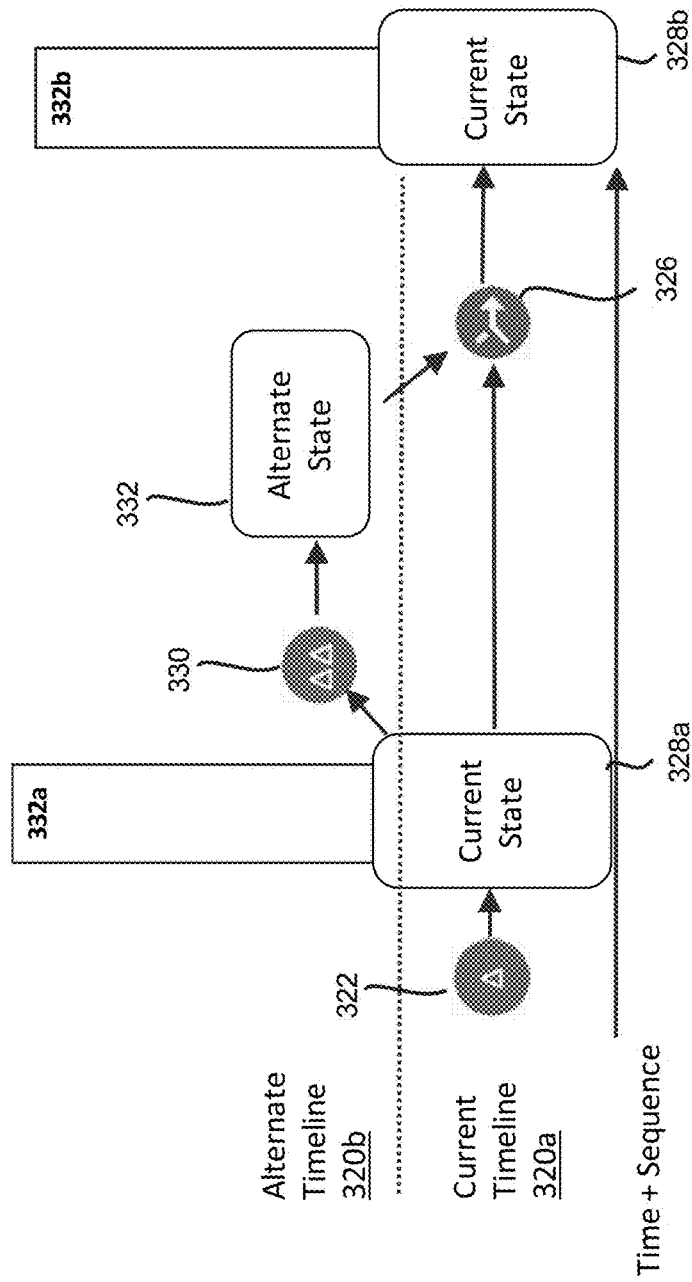

Timelines are discussed in further detail with respect to FIGS. 3A-B.

Evaluation module 220 receives the data file containing data for the alternate time from collection module 210. Evaluation module 220 may then evaluate the data in the data file based on the policies and protocols associated with the timeline. In several embodiments, evaluation of the data involves evaluation module 220 examining the alternate state of the alternate timeline and determining whether there are any potential errors in the protocols, resources, and/or enterprise system 200 when the transaction was applied to the alternate timeline. Errors in applying the transaction may indicate that the transaction is not compliant with the protocols and resources of the enterprise system 200; conversely, lack of any errors may indicate that the transaction is compliant.

Evaluation module 220 may create a data package that includes the determination whether the data package is compliant or non-compliant, along with relevant details of the evaluation such as the evaluated protocols and resources as well as the reason or reasons for failure if the transaction is non-compliant. In some embodiments, the determination can also include a status of compliant by exception. The data package may also include remediation actions to cure non-compliance. Examples of remediation include transmitting notifications, quarantining non-compliant resources, terminating resources, and disabling protocols. In some embodiments, no remediation may be necessary because the alternate timeline being evaluated is merely proposed without an intended impact on the current timeline. In such embodiments, when there is determined non-compliance, the enforcement module 230 may return a notification of non-compliance. In other embodiments, the post-provisioning evaluation may be provided by monitoring module 260 and remediation may be included in the data file. If in performing the pre-provisioning check module 202, the alternate state indicates any errors in applying the transaction, the further action may include aborting application of the transaction. The evaluation module 220 may also return a message to the device that initiated the pre-provisioning check indicating that the transaction is non-compliant and the reasons for non-compliance.

In several embodiments, a non-compliant decision in a pre-provisioning check module 202 will stop application of the transaction in the enterprise system 200. In such embodiments, the remediation action may include installing a new policy that cures the non-compliance or an exception to the non-compliance which would allow the transaction to be applied. The evaluation module 220 provides the data package to the enforcement module 230 for further action including applying the transaction (e.g., if the transaction is compliant) or performing any of the remediation actions identified in the data package.

Enforcement module 230 enforces the actions identified in the data package received from the evaluation module 220. A pre-provisioning check request involving pre-provisioning check module 202 invokes all components of the enterprise system 200. A pre-provisioning check request is effectively seeking to determine whether the proposed policy will result in future compliance by enterprise system 200. Collection module 210 assembles the relevant policies and protocols associated with the pre-provisioning check request, retrieves data necessary to evaluate the proposed policy and includes them in the data file transmitted to evaluation module 220. Evaluation module 220 determines the compliance of the new policy and passes the results of the evaluation to enforcement module 230 for appropriate action. For a pre-provisioning check request, remediation actions may typically be a notification whether the proposed policy is compliant, non-compliant, or compliant by exception and the party that submitted the pre-provisioning check takes any necessary actions as a result of the notification.

In other embodiments involving post-provisioning check requests, a post-provisioning check module 204 determines the impact of proposed policies based on existing resources in enterprise system 200. In such embodiments, the remediation performed enforcement module 230 are based on actions specified in the policy and protocol. For example, if the data package may indicate that the transaction may be applied without any errors, the enforcement module 230 initiates the actions necessary to actually provision the transaction in the enterprise system 200 and sends the notice of this provisioning to the archive 240 for storing in the current timeline as an entry to update the current state of the enterprise system 200. The enforcement module 230 is also responsible for noting the implementation (and results) of the enforcement actions and storing this information in the archive 240. In addition, the enforcement module 230 may also initiate housekeeping actions that are specified by the maintenance module. If the data package indicates that the alternate state of the alternate timeline specifies a non-compliant transaction, the enforcement module 230 does not take any enforcement actions. Conversely, if a post-provisioning check module 204 results in a non-compliant decision, the enforcement module 230 may initiate the actions necessary to bring the already deployed resources or protocols into compliance if such actions are specified by the policy The enforcement module 230 has elevated privileges because it needs the capability to affect or modify resources and protocols in the enterprise system 200. In some embodiments, the enforcement module 230 is the only component in enterprise system 200 that has elevated privileges because it is the only component with the responsibility to modify resources and protocols.

Archive 240 is responsible for recording activities of the enterprise system 200 as a whole, including actions performed by the other components such as the collecting module 210, the evaluation module 220, the enforcement module 230, and the maintenance module 250. Archive 240 includes immutable database 242, which may be an implementation of immutable database 100, discussed above with respect to FIG. 1, data fabric 244, and timeline manager 246. In several embodiments, the immutable database 242 is configured to prevent any data from being overwritten and preserves all actions taken within enterprise system 200. Immutable database 242 stores actions with temporal data (e.g., "valid from" time) that enables it to support current and alternate timelines for the evaluation module 230 to perform its evaluation of transactions.

Timeline manager 246 is a component for managing and generating the current and alternate timelines. Timeline manager 246 works with the immutable database 242 to generate the alternate timeline based on the current timeline and to apply the transaction to the alternate timeline. In several embodiments, timeline manager 246 receives a request from the enforcement module 230 to generate the alternate timeline. The request may include the relevant protocols and resources as well as information needed to duplicate the relevant protocols and resources from the current timeline to an alternate timeline. Timeline manager 246 may further communicate with the immutable database 242 to provide the alternate state of the alternate timeline.

Data fabric 244 is the system of data sources, streams and storage that represent the state of the enterprise system 200. The first location in the execution path of the post-provisioning check module 204 is data fabric 244. Post-provisioning check module 204 utilizes the same modules discussed above for pre-provisioning check but has a different execution path starting with the data fabric 244. The post-provisioning check module 204 includes a request to change an already deployed resource or policy and includes information regarding the proposed change. Because post-provisioning check module 204 involves an already deployed resource or policy, the request is routed first to the data fabric 244 to obtain relevant information about the already deployed resource or policy in the enterprise system 200.

In several embodiments, immutable database 242 records all changes of state in enterprise system 200, including changes to protocols and resources, and is implemented as a persistent data store. Because immutable database 242 records all actions of enterprise system 200, it can serve as an archival journal of the aggregate state of the enterprise system 200 from the time that the enterprise system 200 is activated to a current time. Every record in immutable database 242 can be viewed in the context of a timeline, either in a current timeline that reflects a current state of enterprise system 200 or in an alternate timeline. In other words, the current timeline may represent the actual implementation of protocols and rules within enterprise system 200.

Monitoring module 260 is responsible for observing the state of the enterprise system 200 including the state of deployed protocols and resources. If the states change, the monitoring module 260 records the changes, collects data related to those changes, and passes the collected information to the collection module 210 for creation of the data file. In several embodiments, monitoring module 260 monitors for changes in data fabric 244 and identifies situations that require a post-provisioning check module 204. As one example, the monitoring module 260 may identify events in the data fabric 244 that correspond to resources that were provisioned without a pre-provisioning check module 202. The monitoring module 260 may also be responsible for monitoring changes in already deployed protocols or resources and triggering the post-provisioning check module 204 of relevant existing protocols and resources based on the monitored changes.

Maintenance module 250 is responsible for the creation and maintenance of protocols which includes authoring protocols as well as testing and debugging protocols before they are submitted for deployment in enterprise system 200. The maintenance process includes the entire life cycle of creation, installation, monitoring, maintaining, and retirement of protocols. In several embodiments, the maintenance module 250 may submit requests for initiating but not executing the testing of protocols via pre-provisioning check module 202 and post-provisioning check module 204. In several embodiments, the maintenance module 250 may maintain and enforce life cycle status of every policy and protocol including authorization and approvals.

The maintenance module 250 also is responsible for validating the authorization of protocols. After protocols or resources are provisioned, maintenance module 250 signs them with a cryptographically strong signature to indicate that it was the authority that approved the changes but also indicating the state of both the protocols and the enterprise system 200 at the time of approval. Protocols must be authorized (i.e., signed) by maintenance module 250 before being sent for storage in archive 240 and being deployed.

This restricts the ability of an attacker to propagate and activate spurious protocols within enterprise system 200. It also provides a forensic trail in the event of an audit request to ascertain the provenance of enforced protocols. Protocols are stored with their authorization in a timeline of archive 240. Archive 240 and immutable database 242 store data in the same manner as the data is received. It does this by computing and storing checksums separately from the data. Accordingly, retrieved data may be flagged as broken or corrupt if it does not match the corresponding checksums. In this manner, checksums provide a mechanism for ensuring that the stored data is identical to the data as it was received and stored by archive 240 and immutable database 242.

Timelines

FIG. 3A is a flow diagram illustrating a journal 300A with different timelines created by an immutable database for processing transactions, according to some embodiments. As described herein, a timeline is a time-ordered data series or sequence that provides a view of transactions in a time-based sequence. The sequence that the transactions are stored may be based on metadata associated with the transactions (e.g., a time that the transactions were created, a time that the transactions are valid) or based on when the transactions were received and processed. In addition to storing the transactions, the timeline may also include information about the state of the system after receipt of each transaction. In this manner, the timeline also reflects how the state of the system (or components within the system) is changed after each transaction.

Journal 300A is an improved immutable log that not only stores all transactions and state information of nodes maintained by an immutable database but also allows for the creation of alternate timelines that branch off the current timeline. In this manner, alternate timelines are based on actual transactions of the current timeline up until the specific transaction that is to be tested. From that specific transaction, the immutable database may create an alternate timeline using a retroactive transaction. The alternate timeline therefore is based on the current state of the node at the time of the specific transaction but then branches off into a new alternate state that takes into account the correction proposed by the retroactive transaction.

For illustrative purposes only, journal 300A is discussed with respect to particular embodiments where the immutable database is implemented in a financial system. However, the immutable database and journal 300A are not intended to be limited solely to these embodiments.

In several embodiments, current timeline 301a, alternate timeline #1 301b, and alternate timeline #2 301c are associated with a node (e.g., financial account). Journal 300A may store timelines for each node maintained by the immutable database.

Current timeline 301a includes different transactions such as transactions 304a-e, snapshot events 306a-b, and merge events 308a-b. In several embodiments, current timeline 301a includes all transactions for the node provided along a temporal sequence leading to a current state 314 of the node. As an example, if the node is implemented as a financial account for a user, current timeline 301a represents all transactions that occurred for that financial account leading to the current balance (i.e., current state) at a current time. As another example, the node may represent an enterprise system in which multiple protocols and resources are implemented and current timeline 301a represents all protocols and resources that have been implemented in the enterprise system leading to the current environment or infrastructure (i.e., current state) at a current time.

Transactions 304a-e may include any actions that may result in a modification to the current state of the node. In the context of the node being implemented as a financial account, transactions 304a-e may be withdrawals and deposits taken on the financial account. In the context of the node being an enterprise system, transactions 304a-e may be a different policy or resource that has been implemented within the enterprise system.

Snapshot events 306a-b represent stored views of the state of the node at a particular time. For example, snapshot event 306a represents the state of the node after transactions 304a and 304b and snapshot event 306b represents the state of the node after transactions 304a-304d. Snapshot events 306a-b may also include other information of the system including a snapshot of all timelines in the system and not just of the current timeline 301a.

Certain historical transactions may also be archived into long-term storage. An example of long-term storage is block storage which may be cheaper but slower in response to queries. For example, archived transactions 302 may include transactions 304a-d, transactions 310a-c, and 312a.

Merge events 308a-b are points in the timeline where alternate events in any of alternate timeline #1 301b and/or alternate timeline #2 301c are incorporated into the current timeline 301a. Alternate timeline #1 301b includes different events such as transactions 310a-d and alternate timeline #2 301c includes different events such as transactions 312a-b. Transaction 310a and transaction 304b represent transactions at a time 316a (e.g., June 1). In several embodiments, transaction 310a may be a correcting transaction that is a retroactive transaction to correct transaction 304b. In some embodiments a correcting transaction may be a direct correction (i.e., directly replacing) a prior transaction. In some embodiments, a correcting transaction may be a new prior transaction. One example of such a new prior transaction is a transaction that was incorrectly recorded on a wrong date (e.g., Jun. 10, 2021) and a new prior transaction is to be created on the correct date (e.g., Jun. 3, 2021). In the alternate timeline #1 301b, the new prior transaction would have a "valid from" date of June 3, a "created at" date of June 10, and all transactions after the June 3 "valid from" date would be replayed to create a new current state based on the new prior transaction being placed on the correct date. Transaction 304b may be a classic transaction having a "created at" time that is the same as the "valid from" time. Transaction 310a may be a retroactive transaction created after transaction 304b, and therefore having a different "created at" time, but having the same "valid from" time as transaction 304b. Both transaction 310a and transaction 304b have a "valid from" time that matches time 316a.

Upon receiving retroactive transaction 310a, the immutable database may determine that retroactive transaction 310a has a "valid from" time (e.g., June 1) that matches time 316a and that the retroactive transaction 310a should be applied as of that time. In order to do this, the immutable database generates alternate timeline #1 301b based on the current state of the node before the time 316a. As of time 316a, the current state of the node is represented by transaction 304a. In this manner, retroactive transaction 310a may be applied to the same state of the node to which transaction 304 was applied and ensures that alternate timeline #1 301b provides an accurate alternate depiction of the state of the node after applying retroactive transaction 310a.

Accordingly, the immutable database, as of time 316a, stores both current timeline 301a, which represents a timeline of transactions that lead to the current state of the node, and alternate timeline 301b, which represents a timeline with alternate transactions that do not yet affect the current state of the node. Generation of the alternate timeline 301b provides an environment where retroactive transaction 310a is applied to the same state as transaction 304b. Because alternate timeline 301b is separate from the current timeline 301a, application of retroactive transaction 310 does not impact the current state of the node. This may be important because if applying retroactive transaction 310a causes an error to the current state of the node, this effect may be identified prior to the retroactive transaction 310a being actually applied to the current timeline 301a. In this way the system is protected from inadvertent introduction of new errors when attempting to correct a different error. That is, if execution of alternate timeline 301b results in an error condition, then the alternate timeline 301b may be discarded. If there are no errors, alternate timeline 301b may be promoted to the current timeline.

Consider again the example where the current state of the node represents an account balance of a user's financial account. Transactions 304a, 304b, and 310a may be any event that changes the account balance such as a withdrawal or deposit. For example, transaction 304a may be a deposit of $100 which adds that amount to the account balance. Prior to time 316a, the current state of the account balance is $100 based on transaction 304a. At time 316a, in current timeline 301a, the immutable database next processes transaction 304b. For example, transaction 304b has a "created at" time and/or a "valid from" time that is later in time than transaction 304a which causes transaction 304b to be processed after transaction 304a. Transaction 304b may be a withdrawal of $90 which substrates that amount from the account balance. Accordingly, in current timeline 301a at time 316a, the current balance of the account is $10.

If the actual transaction recorded by transaction 304b was a withdrawal of $50, the immutable database may apply a retroactive transaction to the current timeline to correct the error. Transaction 310a may be a retroactive transaction that includes the corrected amount (e.g., $50) as well as temporal metadata to identify the "valid from" time (e.g., June 1), and may further include other information to identify the transaction that needs to be corrected (e.g., transaction 304b). The immutable database uses the temporal metadata to identify the state of the node prior to the "valid from" time (e.g., an account balance of $100 based on transaction 304a). Using the state of the node as the starting point, the immutable database may then generate alternate timeline #1 301b using transaction 310a which would result in an alternate state of the node (e.g., an account balance of $50) at time 316a compared to the current state of the node (e.g., $10).

Similarly, transactions 310b and 304c represent transactions at another time 316b (e.g., June 2). In several embodiments, the immutable database continues to calculate the alternate state of the node in alternate timeline #1 301b based on transactions received by the immutable database after time 316a. For example, transaction 304c may be a deposit of $50. In the current timeline 301a, the current state of the node would then be $60 after processing transaction 304c. In alternate timeline #1 301b, the immutable database processes transaction 310b, which may mirror transaction 304c, by applying transaction 310b to the alternate state of the node in alternate timeline #1 301b as of time 316b. In other words, the immutable database essentially replays the same transaction (i.e., transaction 304c) in the alternate timeline #1 301b that follow in time-order sequence to transaction 310a. This results in applying the same amount specified in transaction 304c but as a separate transaction to the alternate state in the alternate timeline #1 301b (e.g., balance of $50) instead of the current state of the node (e.g., balance of $10) which would result in a new alternate state of the node as of time 316b (e.g., $100).

Similarly, transactions 312a, 310c, and 304d represent transactions at another time 316c (e.g., June 3). In several embodiments, the immutable database continues to calculate the alternate state of the node in alternate timeline #1 301b based on transactions received after time 316b. For example, transaction 304d may be a withdrawal of $75. In the current timeline 301a, the current state of the node would result in an overdraft of $15 (i.e., subtracting $75 from the current state of the node at time 316c, $60) on the account. Based on this overdraft, transaction 304e at time 316d (e.g., June 4) may represent an overdraft charge on the account which is recorded in the current timeline 301a because the current state of the account reflects the overdraft amount.

In alternate timeline #1 301b, the immutable database processes transaction 310c which may mirror transaction 304d in that transaction 304c is applied to the alternate state of the node in alternate timeline #1 301b as of time 316c. In other words, as with transaction 304c, the immutable database essentially replays the same transaction (i.e., transaction 304d) in the alternate timeline #1 301b that follows in time-order sequence to transaction 310b. This results in applying the same amount specified in transaction 304d but as a separate transaction to the alternate state of the node (e.g., balance of $100) instead of the current state of the node (e.g., balance of $60) which would result in a new alternate state of the node as of time 316c (e.g., $25).

Accordingly, in alternate timeline #1 301b, transaction 310c at time 316c does not result in an overdraft charge and transaction 310d is a retroactive transaction that functionally removes the overdraft charge resulting in an alternate state of the node as of time 316d. So at time 316d after processing transaction 304e (e.g., overcharge fee), in current timeline 301a, the current state of the node includes a balance with an overdraft amount of $15 and an overcharge fee. In contrast, the alternate state of the node in alternate timeline #1 301b at time 316d after processing transaction 310d includes a balance of $25 and no overcharge fee.

The immutable database may receive a command to promote the alternate state of alternate timeline #1 301b as the current state. This command may be the result of determining that the alternate state of the alternate timeline #1 301b is the accurate depiction of the state of the node as of time 316d. In the example discussed above, this means that the balance of $25 indicated by alternate timeline #1 301b is correct and should replace the incorrect balance of an overdraft of $15 that is indicated by current timeline 301a at time 316d. In some embodiments, immutable database may automatically alternate timeline #1 301b (without requiring a command) based on the results of evaluation indicating no processing errors and may be triggered by, for example, an indication that no errors have occurred.

The immutable database may initiate a merge event 308a in response to receiving the command. Merge event 308a results in promoting the alternate timeline #1 301b and its transactions (i.e., transactions 310a-d) and the alternate state into the current timeline 301a to update the current state 314 of the node. In several embodiments, promoting means replacing transactions of the current timeline 301a with the corresponding transactions of the alternate timeline #1. For example, transaction 310a replaces transaction 304b at time 316a in the current timeline 301a. Similarly, transaction 310b replaces transaction 304c at time 316b, transaction 310c replaces transaction 304d at time 316c, and transaction 310d replaces transaction 304e at time 316d. Accordingly, at merge event 308a, current state 314 of is updated to reflect the alternate state of alternate timeline #1 301b (e.g., replacing the overdraft of $15 with the balance of $25).

Beneficially, even though transactions 304b-d are replaced, they are not overwritten within the immutable database. Indeed, the immutable database may prevent any data or transactions from being overwritten, and maintains records of all transactions and allows them to be queried, such as for auditing purposes.

In several embodiments, the immutable database may receive transaction 312a that includes a "valid from" date of time 316c and indicating that it is a retroactive transaction of transaction 304d. For example, transaction 312a may indicate that the amount indicated in transaction 304d is incorrect and that another correction needs to be applied to the state of the node. The immutable database may generate alternate timeline #2 301c in a similar manner as it generated alternate timeline #1 301b.

In several embodiments, transaction 312a may have a "created at" time after a merge event but a "valid from" time of time 316c. Accordingly, the immutable database recognizes transaction 312a as a retroactive transaction. Transaction 312a may include other information that indicates the transaction it is intended to correct (e.g., transaction 304d) as well as the intended correction (e.g., $60 instead of $75). Because the immutable database receives transaction 312 after the merge event 308a (when transactions of alternate timeline #1 301b have been promoted), the immutable database generates alternate timeline #2 301c based on the alternate state of the node as indicated by alternate timeline #1 301b. Accordingly, the state of the node indicated by alternate timeline #2 301c at time 316c after processing transaction 312a is the balance of the account after withdrawing $60 from the state of the node indicated by the alternate timeline #1 301b at time 316 (e.g., a balance of $100).

At time 316d, transaction 312b may mirror transaction 310d which is the removal of the overdraft charge applied by transaction 304e. The merge event 308b may be processed in a similar manner described above with respect to merge event 308a.

Regarding FIG. 3B, consider another example where the current state of the node represents a resource environment where resources may be provisioned in compliance with the protocols. Transaction 322 may be any event that changes the resource environment such as a new resource to be provisioned, a change in an existing policy already implemented in the resource environment, or a new policy to be implemented in the resource environment.

FIG. 3B is a flow diagram illustrating a journal 300B with different timelines created by an immutable database for processing transactions, according to some embodiments. Like journal 300A, journal 300B is an improved immutable log that not only stores all transactions and state information of nodes maintained by an immutable database but also prevents previously stored transactions from being overwritten. For illustrative purposes only, journal 300B is discussed with respect to particular embodiments where the immutable database is implemented in a resource environment. However, the immutable database and journal 300B are not intended to be limited solely to these embodiments.

In several embodiments, current timeline 320a and alternate timeline 320b are associated with an overall state of the system such as the resource environment that provisions resources that comply with protocols in the environment. Current timeline 320a includes different transactions such as transaction 322 and merge event 326 at different times along the current timeline 320a. In several embodiments, current timeline 320a includes all transactions applied to the system displayed along a time-ordered sequence leading to a current state 328a of the resource environment at time 332a. For example, the current state 328a may indicate that the operating condition (e.g., all components are operating normally, any errors in any of the components) of the resource environment. The current timeline 320a can represent transactions that have been applied to the resource environment and have contributed to the current state 328a of the resource environment as of time 332a. Transactions in current timeline 320a including transaction 322 may include any events of the resource environment such as adding new resources or protocols to the resource environment or modifying resources or protocols already implemented in the resource environment.

The immutable database may receive transaction 330. In the context of a resource environment, transaction 330 may be a request that changes a component in the resource environment, such as provisioning a resource or implementing a new policy in the resource system. Prior to applying transaction 330 to the current timeline 320a, the immutable database may be used to test the transaction 330 within the system to determine its potential impact on the state of the system. For example, testing the transaction 330 may allow a determination of whether implementing the transaction in the resource environment would cause an error, such as whether provisioning the resource would comply with protocols of the resource environment, or whether changing a policy would cause other security risk, just to name a few examples.

In order to perform the test, the immutable database may generate alternate timeline 320b for testing the impact of transaction 330 to the current state 328a of the resource environment without affecting the current timeline 320a. While current timeline 320a represents the current transactions applied to the system, transactions in the alternate timeline 320b do not affect the system. Alternate timeline 320b may therefore be considered an isolated and safe execution space for transactions.

In order to accurately assess the impact of transaction 330, the transaction 330 is to be applied to the actual state of the system as represented in the current timeline 320a as of the "valid from" time of the transaction 330. For example, transaction 330 can indicate a "valid from" time 332a. To generate the alternate timeline 320b, the immutable database may collect the current state 328a of the system as of time 332a, duplicates this current state 328a to the alternate timeline 320b, and applies transaction 330 to the duplicated state. In this manner, the immutable database may provide an accurate assessment of how transaction 330 would affect the current state 328a but in a separate execution space of the alternate timeline 320b.

As a non-limiting example, if transaction 330 is a request to provision a new resource within the resource environment, the immutable database may collect the current state 328a of the resource environment, which would include all the resources and protocols already implemented in the resource environment as of time 332a. The immutable database duplicates those resources and protocols (i.e., the current state 328a) to the alternate timeline 320b and performs a check of the new resource against the already provisioned resources and already installed protocols. In several embodiments, performing this check may include determining whether the new resource complies with the protocols of the resource environment.

The result of performing this check may be stored as alternate state 332, which may represent the operating condition of the system after transaction 330 is applied to the current state 328 in the alternate timeline 320b. Alternate state 332 represents a hypothetical current state of the system since it does not represent the actual state of the system. If the alternate state 332 indicates normal operating condition (i.e., no errors when transaction 330 is applied), the immutable database may initiate a merge event 326 to incorporate transaction 330 into the current timeline 330a. Merge event 326 results in applying transaction 330 to the current timeline 320a and affects the state of the system which results in a new current state 328b at time 332b. Time 332b is subsequent in time to time 332a. Applying transaction 330 to the current timeline 320 may be done in any number of ways, including promoting the alternate timeline 320b (which includes all of the duplicated previous transactions from current timeline 320a) to be the new current timeline (e.g., replacing current timeline 320a) or applying transaction 330 to the current state 328a within the current timeline 320a. If the alternate state 332 indicates an error when transaction 330 was applied, then an error message can be generated without a merge event 326. Importantly, alternate timeline 320b is not discarded but is preserved within the immutable database.

Figure 5:
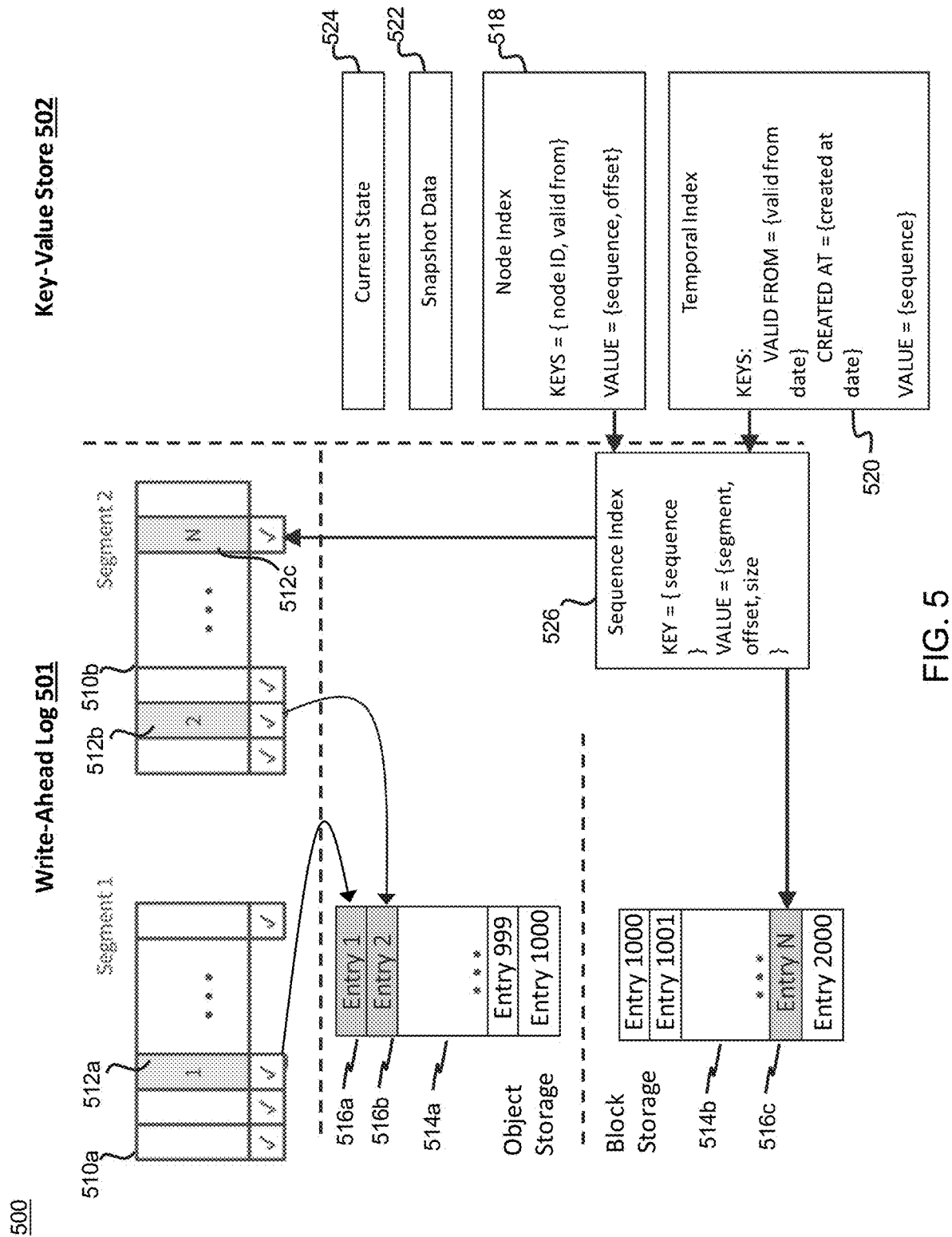
FIG. 5 is an exemplary file system of the immutable database, according to some embodiments.

FIG. 5 is an exemplary file system 500 of an immutable database, according to some embodiments. File system 500 may include a write-ahead log 501 and a key-value store 502, each of which are used to store different information of file system 500. Write-ahead log 501 may store data using both block and object storage. Key-value store 502 may store data related to temporal indexes and various states of the objects in the immutable database.

In several embodiments, exemplary file system 500 partitions data of the bitemporal ledger 112 into shards, where subsets of the overall data in the bitemporal ledger 112 are stored in separate stores but linked together using indexes. Sharding is a technique for splitting data into subsets and distributing the subsets across different storage locations. Each storage location (e.g., a server) is identified as a shard. For example, in bitemporal ledger 112, write-ahead log 501 may be identified as a shard and key-value store 502 may be identified as another shard.

One implementation aspect of shards is that there does not need to be any communication between shards. A benefit of this sharded database approach is the ability to scale with increased demand and fault tolerance should one or more shards fail. Because subsets of data may be distributed across different shards, and these shards do not communicate with each other, queries to read or join the subsets of data rely on mapping or linking between the data.

Write-ahead log 501 stores transactions in segments 510a and 510b prior to executing the transaction. In an embodiment, the transactions may first be stored in segments 510a and 510b prior to being moved to graph stream 514a for long-term storage. Graph stream 514a may be located in object storage. Segments 510a and 510b represent a log into which the transaction is first recorded before it is executed. For example, a transaction may be first stored in entry 512a of segment 510a before the transaction is executed. Executing the transaction in entry 512a provides a result which can then be committed as an entry 516a of graph stream 514a. Similarly, executing a transaction stored in entry 512b may provide a result which can then be committed as an entry 516b of graph stream 514a. Graph stream 514a may be implemented as object storage. Conversely, graph stream 514b may be implemented as block storage which is typically cheaper than object storage but provides slower response to queries and retrieval.

As segments and transactions age, they can be moved to graph streams in block storage, which is cheaper than object storage. For example, a transaction stored in entry 512c of segment 510b may be moved to entry 516c of graph stream 514b located in block storage. The process of moving the transaction in entry 512c to entry 516c involves storing sequence index 526 with the transaction. Sequence index 526 includes information used to identify where the transaction is to be stored in the graph stream and includes key values to node index 518 and temporal index 520, which are located in key-value store 502. Separating the data across the write-ahead log 501 and key-value store 502 has the benefit of allowing write-ahead log 501 to process transactions more quickly.

Key-value store 502 may also include snapshot data 522 (e.g., from snapshot events 306a and 306b in FIG. 3A), as well as information regarding the current state 524 of objects in the immutable database implemented by file system 500.

Methods of Operations

Figure 6:
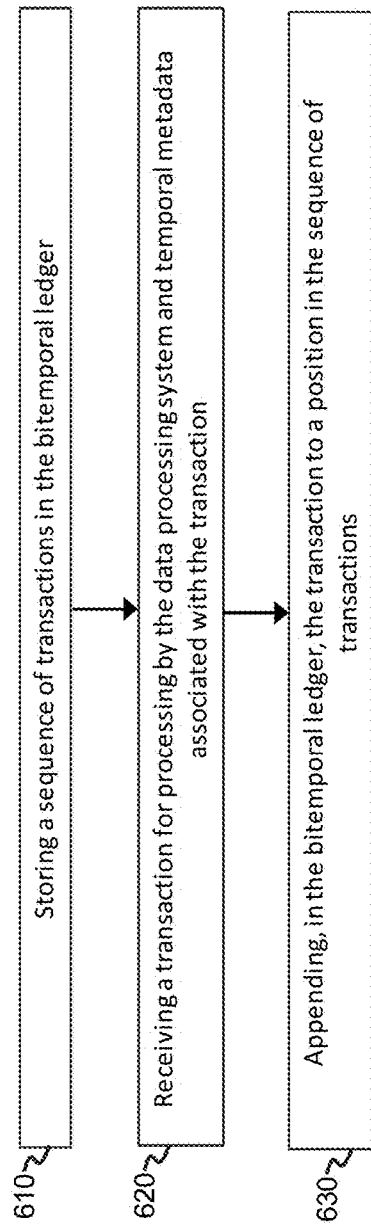
FIGS. 6-8 are exemplary flow charts illustrating example operations of an immutable database, according to some embodiments.
Figure 7:
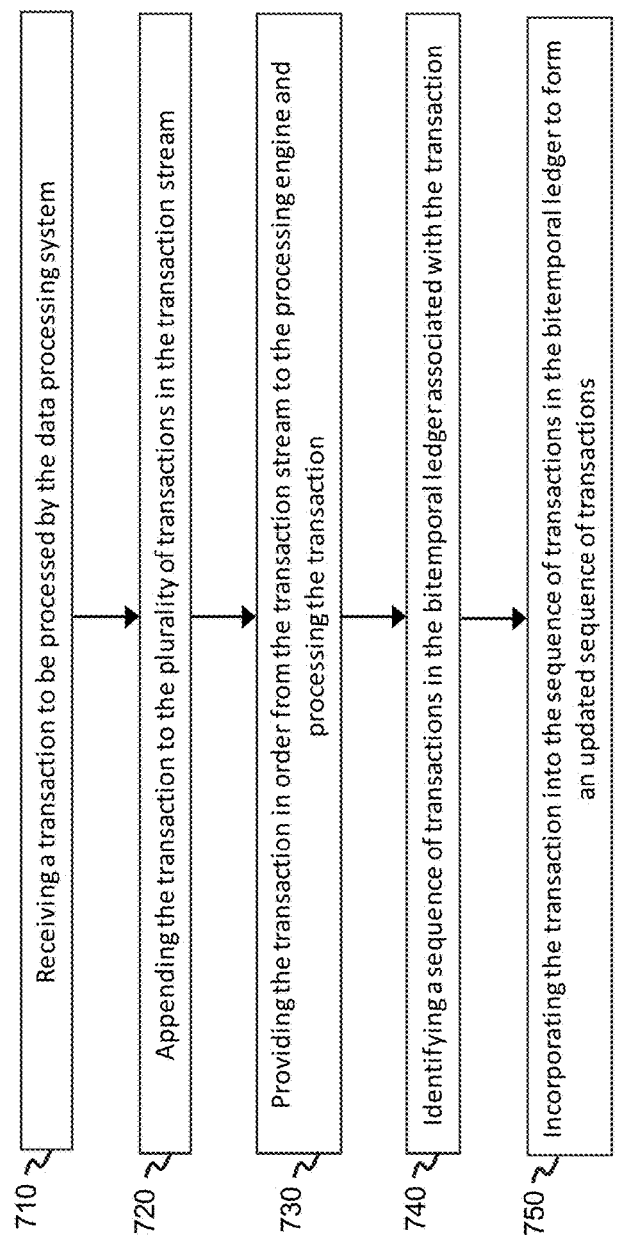
Figure 8:
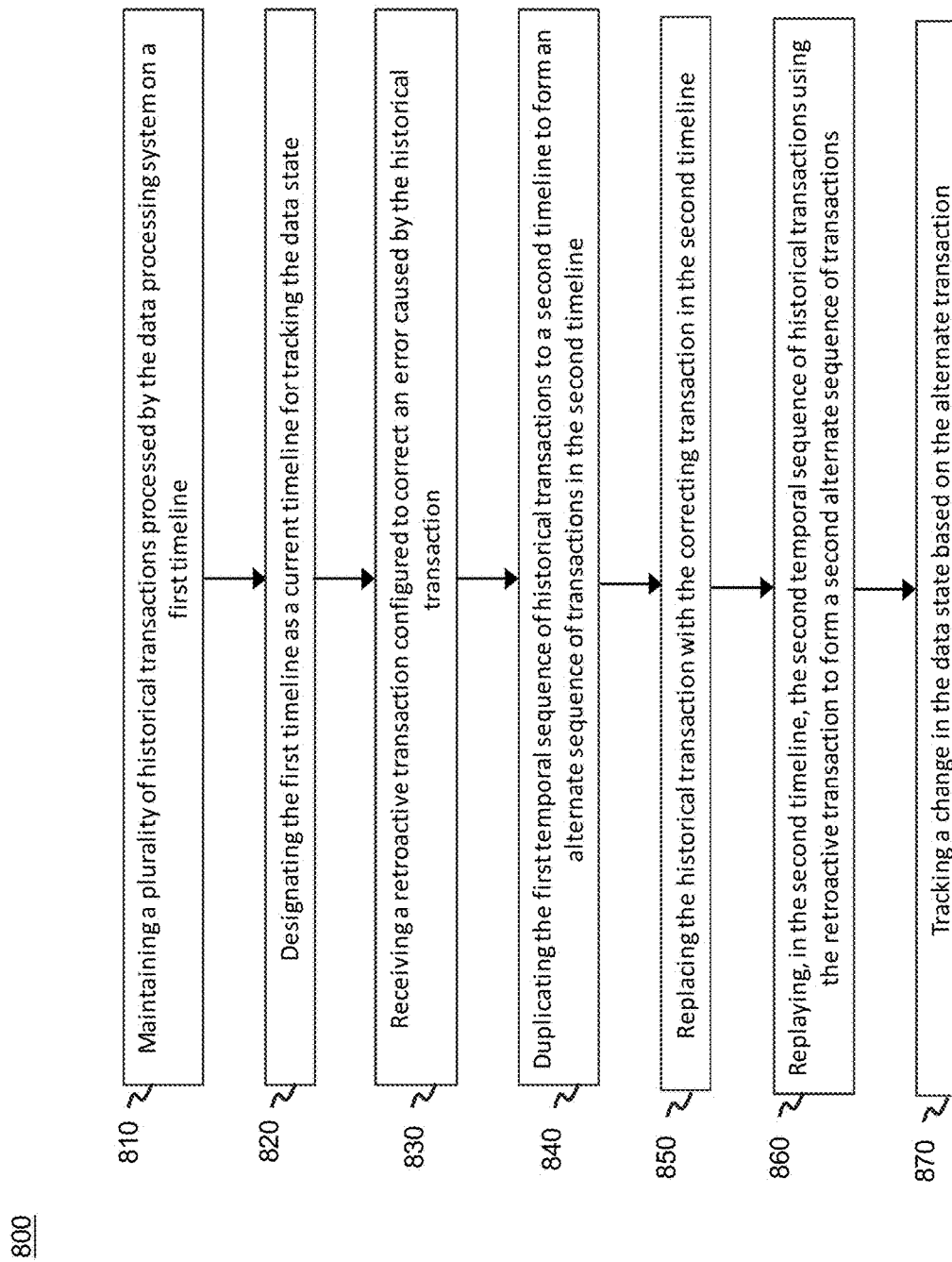

FIGS. 6-8 are flow charts illustrating example operations of an immutable database, according to some embodiments.

FIG. 6 is an example method 600 of operating immutable database 100, immutable database 242, or a combination thereof, to store events in an immutable manner and enable alternate timeline capability, according to some embodiments.

In several embodiments, the operations of method 600 can be performed, for example, by the functional units or devices described with reference to the immutable database 100, the immutable database 242, the architecture 1200, or a combination thereof. For the sake of brevity (and not limitation), the operations of method 600 shall be described with reference to the immutable database 100 shown in FIG. 1. However, the operations of method 600 are not limited to those example embodiments. For example, additionally or alternatively, one or more operations of method 600 can be performed by immutable database 242, any other suitable component, or any combination thereof. Moreover, method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art(s).

In several embodiments, method 600 may be executed by the components of a data processing system including a bitemporal ledger 112 in immutable database 100. In 610, bitemporal ledger 112 stores a sequence of transactions in the bitemporal ledger. The sequence of transactions may represent transactions that were processed by a data processing system in which the bitemporal ledger 112 (and immutable database 100) may be implemented. In several embodiments, the sequence of transactions may be represented as part of a current timeline showing the transactions in a temporal (or time-ordered) sequence up to a current time. The current timeline may provide a current state of the data processing system as of the current time in a similar manner discussed above with respect to FIG. 3A. The sequence of transactions may include historical transactions that were previously received by the data processing system.

In several embodiments, the plurality of transactions includes a transaction and a plurality of subsequent transactions which follow in time to the second transaction. That is, the plurality of subsequent transactions occur later in time than the second transaction. In the context of a timeline, the plurality of subsequent transactions would be viewed subsequent to the second transaction. The second transaction may be associated with second temporal metadata which may include another valid-from time and another created-at time.

In several embodiments, there may be a plurality of prior transactions which precede the second transaction in time. That is, the plurality of prior transactions occur prior in time to the transaction. In the context of a timeline, the plurality of prior transactions would be viewed prior to the second transaction.

In 620, the data processing system receives a transaction that requires processing.

The transaction may include temporal metadata that was created by the creator of the transaction. In several embodiments, the temporal metadata includes a valid-from time and a created-at time. The valid-from time may indicate a specific execution time in the current timeline of the sequence of transactions where the transaction is to be executed (or deployed). The valid-from time may be provided in relation to the current time. The current time is generally the time at which the data processing system receives the transaction. The created-at time indicates when the transaction was created and also may be used to identify a position of the transaction in relation to the plurality of transactions in the sequence of transactions.

In several embodiments, the transaction may be a retroactive transaction which is configured to correct an error in the second transaction. For example, the second transaction may incorrectly indicate a withdrawal of $50 when the correct amount is $55. If the second transaction has a valid-from time of June 5, then the valid-from time of the transaction should be the same, indicating June 5. The transaction may also include other information that specifically identifies the second transaction such as a transaction identifier as well as information indicating that the transaction is a retroactive transaction such as a command or code that is processed by the data processing system.

In 630, the bitemporal ledger 112 may append the transaction to a position in the sequence of transactions. The position may be based on the temporal metadata. For example, if the temporal metadata includes a valid-from time of June 5, the bitemporal ledger 112 will append the transaction to the appropriate position in the timeline representing the sequence of transactions corresponding to the valid-from time.

In several embodiments, the temporal metadata of the transaction may be utilized to generate an alternate timeline based on the transaction. The bitemporal ledger 112 may generate the timeline by first duplicating the plurality of transactions from the timeline to create a second plurality of transactions to serve as the basis of the alternate timeline. The alternate timeline may comprise an alternate sequence of transactions that is formed based on these second (duplicated) plurality of transactions. In order to test the transaction in the alternate timeline, the bitemporal ledger 112 may generate an alternate sequence of transactions with the retroactive transaction in place of the second transaction at the valid-from time. In some embodiments, the retroactive transaction may be inserted into the alternate sequence of transactions. As part of testing, the bitemporal ledger 112 may generate, based on the retroactive transaction, an alternate transaction in the alternate sequence of transactions that follows the retroactive transaction. This alternate transaction is another entry in the alternate timeline and is a result of applying the retroactive transaction in the alternate timeline. In this manner, the alternate transaction is subsequent to the retroactive transaction on the alternate timeline. The alternate transaction has its own temporal metadata including its own creation time. Because the alternate transaction is generated based on the retroactive transaction, the creation time of the alternate transaction is after the valid-from time of the retroactive transaction.

FIG. 7 is an example method 700 of operating immutable database 100, immutable database 242, or a combination thereof, to provide for storing events in an immutable manner and for enabling alternate timeline capability according to some embodiments.

In several embodiments, the operations of method 700 can be performed, for example, by the functional units or devices described with reference to the immutable database 100, the immutable database 242, or a combination thereof. For the sake of brevity (and not limitation), the operations of method 700 shall be described with reference to the immutable database 100 shown in FIG. 1. However, the operations of method 700 are not limited to those example embodiments. For example, additionally or alternatively, one or more operations of method 700 can be performed by immutable database 242, any other suitable component, or any combination thereof. Moreover, method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art(s).

Method 700 may be performed by a data processing system such as immutable database 100 which may include a real-time interface such as data stream manager 120, a bitemporal ledger 112 configured to store transactions, and a processor such as processing engine 102. Data stream manager 120 may further include a transaction stream for buffering a plurality of transactions.

In 710, data stream manager 120 may receive a transaction to be processed by the data processing system. In some embodiments, the transaction is associated with a user account managed by the data processing system. A transaction can include any action that can be taken on the user account such as withdrawals or deposits (if a financial account) or granting or modifying access privileges (if an account in a resource provisioning system).

In 720, the processing engine 102 may append the transaction to the plurality of transactions in the transaction stream of the data stream manager. In several embodiments, the transaction stream may act as a buffer for incoming transactions, which stores the transactions in order and provides the transactions as requested by the processing engine 102.

In 730, the processing engine 102 may receive the transaction in temporal order from the transaction stream, for example, in response to a request from the processing engine.

In 740-750, the processing engine may process the transaction. In 740, this processing may include identifying a sequence of transactions in the bitemporal ledger 112 associated with the transaction. The sequence of transactions may be represented as a timeline in the bitemporal ledger 112, with the timeline including a plurality of entries. Each entry of the plurality of entries may have a corresponding transaction in the sequence of transactions. The sequence of transactions may store events (e.g., transactions) that are associated with the particular user account. Bitemporal ledger 112 may store multiple sequences of transactions, one for each user account maintained in bitemporal ledger 112. Bitemporal ledger 112 may identify the sequence of transactions based on, for example, an account identifier included with the transaction.

In 750, the processing engine 102 may incorporate the transaction into the sequence of transactions identified by the bitemporal ledger 112. This incorporation may be based on temporal metadata (e.g., valid-from time) associated with the transaction. The combined sequence of transactions with the transaction may be referred to as an updated sequence of transactions. As noted above, bitemporal ledger 112 may be implemented to prevent any previous transactions from being overwritten (to provide a complete archive of transactions for the data processing system and/or for each account in the data processing system). Accordingly, the processing engine and the bitemporal ledger may be configured to prevent any transactions in the sequence of transactions from being overwritten.

In several embodiments, the processing engine 102 may be further configured to store the updated sequence of transactions in the bitemporal ledger 112. The processing engine 102 may be further configured to store a second sequence of transactions in the bitemporal ledger 112. The second sequence of transactions may be associated with another user account managed by the data processing system.

In several embodiments, the processing engine 102 may be further configured to identify a processing module (e.g., products 106*a-n* of FIG. 1). For example, the processing engine 102 may identify a processing module that is configured to process the transaction, and then pass the transaction to the processing module for further processing. The processing by the processing module may execute the transaction in accordance with any protocols of the data processing system.

In several embodiments, the processing engine 102 and bitemporal ledger 112 generate an alternate sequence of transactions based on the updated sequence of transactions. That alternate sequence of transactions may be represented by an alternate timeline and may include the combined sequence of transactions and alternate transactions. The alternate transactions are generated in response to the transaction and therefore follow in temporal order subsequent to the sequence of transactions. An alternate transaction may reflect a change to the sequence of transactions.

FIG. 8 is a method 800 of operating immutable database 100, immutable database 242, or a combination thereof, to provide for storing events in an immutable manner and for enabling alternate timeline capability, according to some embodiments.

In several embodiments, the operations of method 800 can be performed, for example, by the functional units or devices described with reference to the immutable database 100, the immutable database 242, the architecture 1200, or a combination thereof. For the sake of brevity (and not limitation), the operations of method 800 shall be described with reference to the immutable database 100 shown in FIG. 1. However, the operations of method 800 are not limited to those example embodiments. For example, additionally or alternatively, one or more operations of method 800 can be performed by immutable database 242, any other suitable component, or any combination thereof. Moreover, method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art(s).

Method 800 may be performed by immutable database 100 for tracking a data state of a system in which the immutable database 100 is implemented.

In 810, the immutable database 100 may maintain a plurality of historical transactions that have previously been processed by the data processing system in a first timeline or time-ordered sequence. The plurality of historical transactions may include a historical transaction, a first temporal sequence of historical transactions that occurs prior in time to the historical transaction, and a second temporal sequence of historical transactions that occurs subsequent in time to the historical transaction. Each historical transaction in the plurality of historical transactions may be associated with a corresponding change in the data state of the data processing system. Examples of data state include an account balance of a user financial account, the privilege scope associated with a user account in a resource provisioning system, or the operating condition of a data processing system. The first temporal sequence of historical transactions together represent the state of the data processing system as of the time that the historical transaction is valid. The second temporal sequence of historical transactions together represent the state of the data processing system after applying the historical transaction. In several embodiments, the plurality of historical transactions represents all transactions associated with the user account and that have been processed by the data processing system.

In 820, the immutable database 100 may designate the first timeline as a current timeline for tracking the data state. As noted above, the current timeline may provide a current state which represents an actual representation of transactions that have been processed by the data processing system.

In 830, the immutable database 100 may receive a retroactive transaction configured to correct an error in the historical transaction. For example, examples of retroactive transactions include a request by an administrator to correct a potential risk in a security policy (such as an over-privileged role) or a request to correct a withdrawal transaction associated with a user financial account.

In 840-870, the immutable database 100 may correct the historical transaction based on the retroactive transaction by generating an alternate timeline to first test the retroactive transaction. In 840, the immutable database 100 may duplicate the first temporal sequence of transactions to a second (alternate) timeline to form an alternate sequence of transactions in the second timeline.

In 850, the immutable database may replace the historical transaction with the retroactive transaction in the second timeline. Replacing the historical transaction may mean generating the alternate timeline based on the retroactive transaction using the first temporal sequence of transactions (i.e., the state of the world prior to the historical transaction).

In 860, the immutable database 100 may replay, using the second timeline, the second temporal sequence of transactions using the retroactive transaction to form a second alternate sequence of transactions that includes an alternate transaction. By replaying the same sequence of transactions based on the retroactive transaction, the immutable database 100 may determine how the retroactive transaction impacts (i.e., changes) the state of the world at a time after the historical transaction.

In this manner, the second temporal sequence of historical transactions may include a transaction that provides a first change to data state based on the historical transaction while the second alternate sequence of transactions comprises the same transaction that provides a different change in the data state based on the retroactive transaction. The difference in data states is based on the change from the historical transaction to the retroactive transaction. An example is illustrative. Consider a first temporal sequence of transactions that may represent a first set of withdrawals and/or deposits on a financial account that occurs prior to the historical transaction and the second temporal sequence of transactions may represent a second set of withdrawals and/or deposits on the financial account that occurs subsequent to the historical transaction. Generating the alternate timeline based on the first set of withdrawals and/or deposits allows the retroactive transaction to be applied to the same state (i.e., account balance) as the historical transaction. Then replaying the second temporal sequence of transactions based on the retroactive transaction allows the immutable database 100 to generate a corrected state (i.e., corrected account balance) based on the same transactions that occurred after the historical transaction. The alternate transaction in the alternate timeline may represent the updated account balance.

In 870, the immutable database 100 may track any changes in the data state based on this alternate transaction. If the changes in the updated data state are correct (i.e., the updated account balance is correct), then the immutable database 100 may designate the second timeline as the current timeline for tracking the data state and designate the first time-ordered sequence as a historical time-ordered sequence. Subsequent transactions would then be appended to the newly designated current timeline so as to be based on the updated data state.

Figure 9:
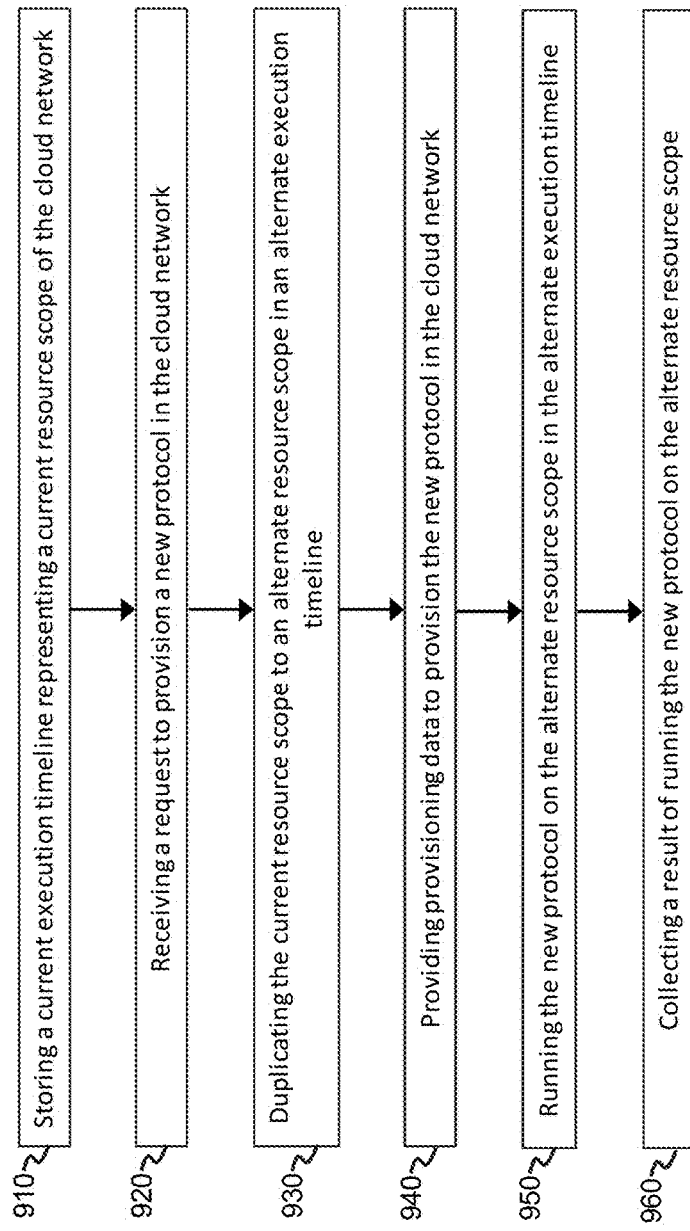
FIGS. 9-11 are exemplary flow charts illustrating example operations of a policy provisioning system implementing an immutable database, according to some embodiments.
Figure 10:
Figure 11:
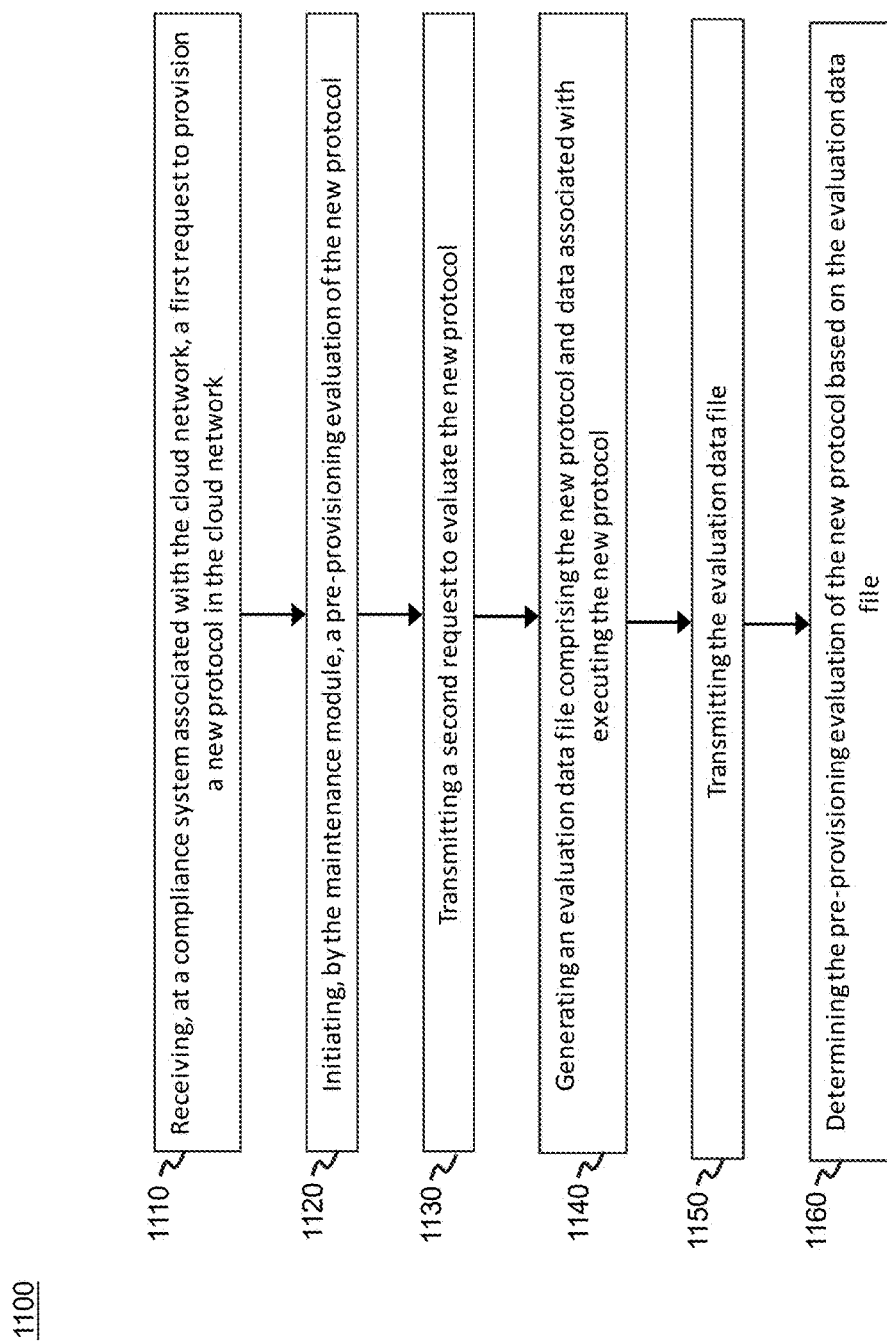

FIGS. 9-11 are exemplary flow charts illustrating example operations of a policy provisioning system implementing an immutable database, according to some embodiments.

FIG. 9 is a method 900 of operating enterprise system 200 using an immutable database 242 to provide for provisioning checks of protocols within the enterprise system 200, according to some embodiments.

In several embodiments, the operations of method 900 can be performed, for example, by the functional units or devices described with reference to the enterprise system 200, or a combination thereof. For the sake of brevity (and not limitation), the operations of method 900 shall be described with reference to the enterprise system 200 shown in FIG. 2. The following discussion of method 900 will refer to devices of FIG. 2 as an exemplary non-limiting embodiment of method 900. Moreover, method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art(s).

Method 900 may be implemented by an enterprise system, such as a cloud network, that implements an immutable database such as immutable database 100. For example, method 900 may be implemented by components of enterprise system 200 for improving protocol compliance in a cloud network by performing a pre-provisioning check on a new protocol.

In 910, the compliance system may store a current execution timeline of the cloud network in an immutable database such as immutable database 100. The current execution timeline reflects the protocols and resources implemented within the cloud network and provides a current resource scope of the cloud network.

In 920, the compliance system may receive a request to provision a new policy (or protocol) in the cloud network. In some embodiments, the request may be to provision a new resource in the cloud network. In some embodiments, the request may be to provision both a new protocol in the cloud network. A new policy means that the protocol has not yet been deployed in the cloud network. In some embodiments, the request is a hook call received from a pre-provisioning interface that is implemented separately from the compliance system.

In 930-960, prior to provisioning the new protocol in the cloud network, the compliance system performs steps to initiate a pre-provisioning evaluation of the new policy. The pre-provisioning evaluation of the new protocol may be used to determine whether the new policy will negatively impact the current resource scope of the cloud network. In 930, the compliance system may duplicate the current resource scope to an alternate resource scope in an alternate execution timeline. For example, the resource scope includes the resources and protocols currently deployed in the cloud network and represent a current state of the cloud network.

In 940, the compliance system may provide provisioning data associated with the new policy. The provisioning data comprises information to provision the new policy in the cloud network. Examples of provisioning data include the brief generated by the collecting module 210 discussed with respect to FIG. 2. The provisioning data may include all relevant resources, protocols, and other information that are needed to deploy the new policy or that are impacted or implicated by the new policy.

In 950, the compliance system may test the new protocol as part of the pre-provisioning check by running the new protocol on the alternate resource scope in the alternate execution timeline. For example, the compliance system may deploy the new policy using the provisioning data and evaluate the results of the deployment including determining whether any security rules were breached, whether already deployed resources or protocols were prevented from operating properly, and errors or conflicts with already deployed resources. In other words, a result may indicate an alternate impact on the current resource scope of the cloud network. This impact may form the basis of whether to deploy the new protocol or to prevent its deployment. For example, if the alternate impact indicates that the new protocol is compliant with the cloud network, the compliance system may apply (or deploy) the new policy to the current execution timeline of the cloud network effectively incorporating the new policy into the current resource scope of the cloud network. Conversely, if the alternate impact indicates that the new protocol is non-compliant with the cloud network, the compliance system may prevent applying the new protocol to the current execution timeline of the cloud network. Non-compliance may mean that the new protocol violates a security rule or the resource scope of the cloud network.

In 960, the compliance system may collect the result of running the new protocol on the alternate resource scope.

In some embodiments, the compliance system allows for queries. For example, the compliance system may receive a query for the current execution timeline of the cloud network. The query may be requesting the current resource scope of the cloud network including which protocols are provisioned in compliance with the cloud network.

FIG. 10 is a method 1000 of operating enterprise system 200 using an immutable database 242 to provide for provisioning checks of protocols within the enterprise system 200, according to some embodiments.

In several embodiments, the operations of method 1000 can be performed, for example, by the functional units or devices described with reference to the enterprise system 200, or a combination thereof. For the sake of brevity (and not limitation), the operations of method 1000 shall be described with reference to the enterprise system 200 shown in FIG. 2. The following discussion of method 1000 will refer to devices of FIG. 2 as an exemplary non-limiting embodiment of method 1000. Moreover, method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art(s).

Method 1000 may be executed by a compliance system that is part of enterprise system 200 for improving policy compliance in a cloud network by performing both a pre-provisioning check of a new policy and a post-provisioning check of a current policy.

In 1010, the compliance system may maintain a state of the cloud network on a current execution timeline in the immutable database 242. The cloud network may be a system that provisions resources and protocols. Accordingly, the state of the cloud network may include a history of transactions associated with resources that are provisioned in the cloud network. The history of transactions may further include transactions previously processed by the cloud network up to a current date.

In 1020, the compliance system may perform the pre-provisioning check of the new policy. The new policy may be received from a user (e.g., administrator or author) in the cloud network. A policy is new if it is not currently deployed within the cloud network. Accordingly, a pre-provisioning check occurs prior to deploying new protocols in the cloud network.

In 1030, the compliance system may receive provisioning information associated with provisioning the new policy in the cloud network. An exemplary embodiment of provisioning information is the brief generated by collection module 210 in enterprise system 200. The provisioning information may include the resources and other protocols that would be impacted by provisioning the new policy in the cloud network. For example, if the new policy is a security policy involving access privileges to a particular storage location, the provisioning information may include the resources at the particular storage location and other protocols involved with providing access privileges to the particular storage location.

In 1040, the compliance system may generate an alternate transaction based on the provisioning information. The alternate transaction may be an entry in an alternate execution timeline that is separate from the current execution timeline. The compliance system may include an immutable database (e.g., immutable database 242) that is capable of generating timelines of transactions including both the current execution timeline and the alternate execution timeline. The alternate transaction may include the results of testing the new policy using the provisioning information on the alternate execution timeline. Based on the alternate transaction, the compliance system may determine whether to provision the new protocol based on an evaluation of the alternate transaction. For example, if the alternate transaction includes a result of the testing, the result may indicate whether the new protocol is compliant or non-compliant with the existing protocols of the cloud network.

In several embodiments, the immutable database populates an alternate execution timeline with an alternate history of transactions using the history of transactions which mirror (i.e., are duplicates of) the history of transactions. The immutable database may use the history of transactions as the current state of the cloud network for testing the new policy. As discussed above, the alternate execution timeline is an execution space for testing the new protocol using the alternate history of transactions (which represent the current state of the cloud network). Testing the new protocol within the alternate execution timeline results in an alternate hypothetical change to the cloud network. This alternate change may be considered a result of the testing and indicates how the state of the cloud network is changed based on deploying the new policy in the cloud network. In some embodiments, the alternate change may be stored as another transaction in the alternate execution timeline and reflects an alternate state of the cloud network. The alternate state may indicate whether there are any errors in the cloud network if the new policy were to be deployed. Determining whether to provision the new policy may be based on this alternate change to the cloud network.

In several embodiments, based on the determining whether to provision the new protocol, the compliance system may either provision the new protocol (if compliant) or prevent the provisioning of the new protocol (if non-compliant). Regardless of whether the new protocol is provisioned or not, the alternate execution timeline is stored in an immutable database of the compliance system (e.g., immutable database 242).

In 1050, the compliance system may perform a post-provisioning check of the current policy. Changes to a current policy (which may be detected by a component of the compliance system such as monitoring module 260) may trigger a post-provisioning check. A policy is current if the policy is already deployed on the cloud network.

In 1060, the compliance system may receive a modification to the current protocol. In some embodiments, receiving a modification may include detecting any modifications in the current policy by monitoring module 260 which is monitoring the current state (e.g., resources and protocols deployed in the enterprise system 200). The compliance system may also receive second provisioning information associated with provisioning the modification (i.e., the modified current policy) in the cloud network. Similar to the provisioning information associated with the new policy, the second provisioning information may include information about protocols and resources that would be affected by the modified current policy.

In 1070, the compliance system may generate a second alternate transaction based on the second provisioning information. The second alternate transaction may be an entry in another alternate execution timeline that is separate from the current execution timeline and also separate from the first alternate execution timeline that was used to perform the pre-provisioning check. The second alternate transaction may include the results of testing the modified current policy using the second provisioning information on the alternate execution timeline. Based on the second alternate transaction, the compliance system may determine whether to provision the modification to the current protocol based on a second evaluation of the second alternate transaction. For example, if the second alternate transaction includes a result of testing the modified current policy, the result may indicate whether the modified current protocol is compliant or non-compliant with the existing protocols of the cloud network.

In several embodiments, based on the determining whether to provision the modified current protocol, the compliance system may either provision the modified current protocol (if compliant) or prevent the provisioning of the modified current protocol (if non-compliant). Regardless of whether the modified protocol is provisioned or not, the second alternate execution timeline is stored in an immutable database of the compliance system (e.g., immutable database 242).

FIG. 11 is a method 1100 of operating enterprise system 200 using an immutable database 242 to provide for provisioning checks of protocols within the enterprise system 200, according to some embodiments.

In several embodiments, the operations of method 1100 can be performed, for example, by the functional units or devices described with reference to the enterprise system 200, or a combination thereof. For the sake of brevity (and not limitation), the operations of method 1100 shall be described with reference to the enterprise system 200 shown in FIG. 2. The following discussion of method 1100 will refer to devices of FIG. 2 as an exemplary non-limiting embodiment of method 1100. Moreover, method 1100 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 11, as will be understood by a person of ordinary skill in the art(s).

Method 1100 may involve a method by a compliance system for improving cloud policy compliance in a cloud network. In 1110, the compliance system may receive a request to provision a new policy in the cloud network, wherein the compliance system comprises an enforcement module, an immutable database, a maintenance module, a collection module, an evaluation module, and a monitoring module. In some embodiments, the cloud network processes transactions associated with a resource in the cloud network.

In 1120, the maintenance module may initiate a pre-provisioning evaluation of the new policy prior to provisioning the new policy in the cloud network. Steps 1130-1160 include steps for initiating the pre-provisioning evaluation.

In 1130, the maintenance module may transmit a second request to evaluate the new policy to a collection module.

In 1140, responsive to the collection module receiving the second request, the collection module may generate an evaluation data file which may include the new policy and relevant data associated with executing the new policy in the cloud network.

In 1150, the collection module may transmit the evaluation data file to the evaluation module.

In 1160, responsive to receiving the evaluation brief, the evaluation module may determine the pre-provisioning evaluation of the new policy based on the evaluation brief. The pre-provisioning evaluation indicates whether the new policy is compliant or non-compliant with implementation rule or rules in the cloud network. The pre-provisioning evaluation may involve communication with a bitemporal ledger in the immutable database. For example, the evaluation module may provide information in the evaluation brief to the bitemporal ledger which will generate an alternate execution timeline for testing the new protocol and its potential (or alternate) change on the state of the cloud network. Part of the testing of the new protocol may further include determining whether the potential change to the state of the cloud is permitted by protocol rules which are associated with enforcement of protocols in the cloud network. In several embodiments, the potential change to the cloud network indicates an alternate transaction associated with the resource. The alternate transaction may indicate the change in the state of the cloud network. The immutable database may record the transactions of the cloud network in a time-ordered sequence in the current timeline and the potential change in the alternate timeline.

In several embodiments, the evaluation module may forward the pre-provisioning evaluation to the enforcement module to determine whether to provision the new policy. The enforcement module may take an appropriate action based on the pre-provisioning evaluation. For example, responsive to the pre-provisioning evaluation indicating that the new protocol is compliant with the cloud network, the enforcement module may provision the new protocol in the cloud network. But responsive to the pre-provisioning evaluation indicating that the new protocol is non-compliant with the cloud network, the enforcement module may prevent the provisioning of the new protocol in the cloud network.

In several embodiments, the compliance system records actions in the immutable database which is in communication with all modules in the compliance system. For example, the collection module may store the evaluation data file in the immutable database and the evaluation module may store the pre-provisioning evaluation in the immutable database. The immutable database may also record the action (e.g., provisioning or preventing the provisioning) taken against the new policy.

Components of the System

Figure 12:
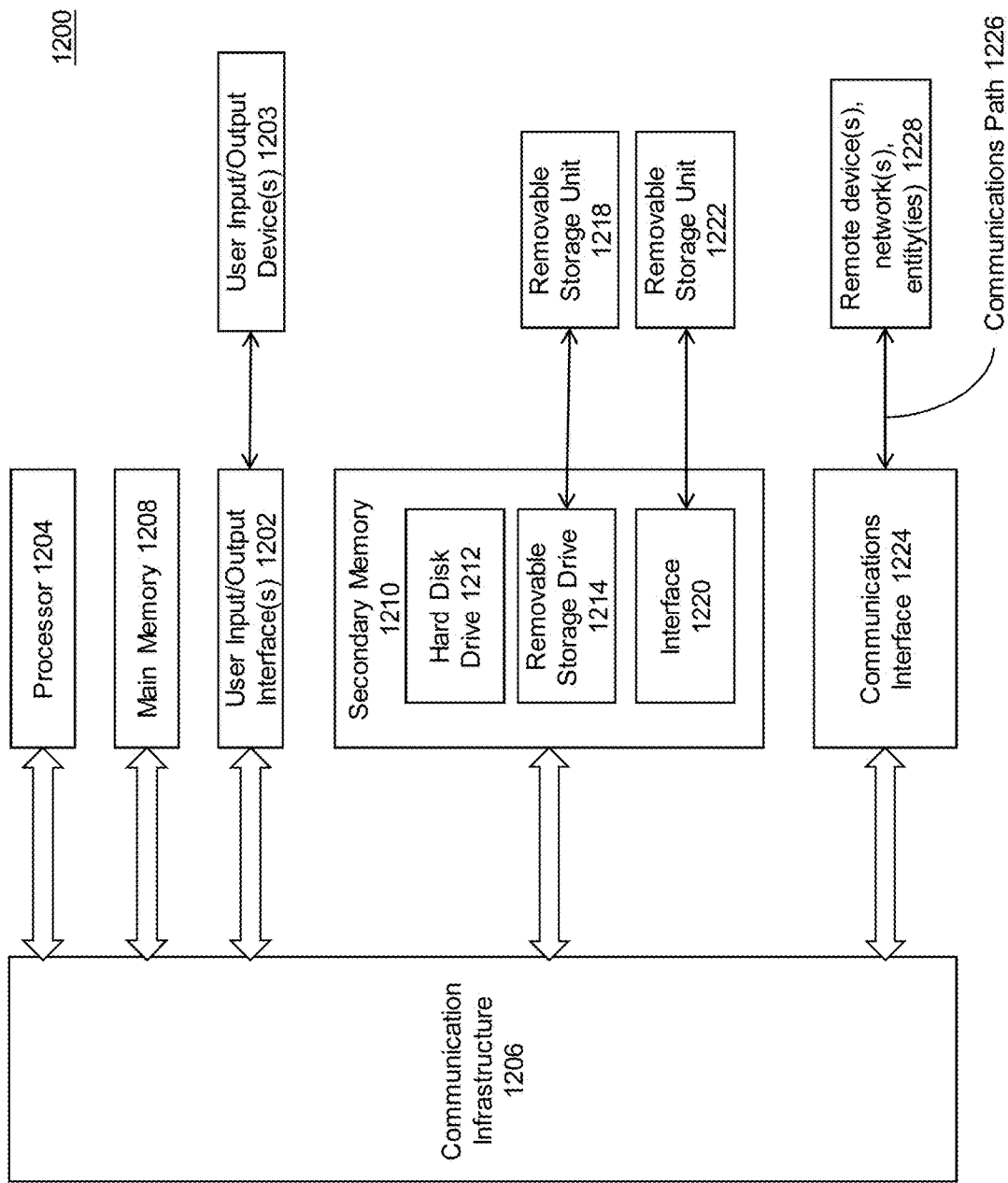
FIG. 12 depicts an example computer system for implementing various embodiments.

FIG. 12 depicts an example computer system 1200 for implementing components of immutable database 100 or enterprise system, or a combination thereof, according to some embodiments. Various embodiments may be implemented, for example, using one or more well-known computer systems, such as computer system 1200 shown in FIG. 12. One or more computer systems 1200 may be used, for example, to implement any of the embodiments discussed herein, as well as combinations and sub-combinations thereof.

Computer system 1200 may include one or more processors (also called central processing units, or CPUs), such as a processor 1204. Processor 1204 may be connected to a communication infrastructure or bus 1206.

Computer system 1200 may also include user input/output device(s) 1202, such as monitors, keyboards, pointing devices, etc., which may communicate with communication infrastructure 406 through user input/output device(s) 1202.

One or more of processors 1204 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 may also include a main or primary memory 1208, such as random access memory (RAM). Main memory 1208 may include one or more levels of cache. Main memory 1208 may have stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 may include a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 may read from and/or write to removable storage unit 1218.

Secondary memory 1210 may include other means, devices, components, instrumentalities or other approaches for allowing computer programs and/or other instructions and/or data to be accessed by computer system 1200. Such means, devices, components, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 may enable computer system 1200 to communicate and interact with any combination of external devices, external networks, external entities, etc. (individually and collectively referenced by reference number 1228). For example, communication interface 1224 may allow computer system 1200 to communicate with external or remote devices 1228 over communications path 1226, which may be wired and/or wireless (or a combination thereof), and which may include any combination of LANs, WANs, the Internet, etc. Control logic and/or data may be transmitted to and from computer system 1200 via communication path 1226.

Computer system 1200 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1200 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 12. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for improving cloud protocol compliance in a cloud network, the method comprising:
   receiving, at a compliance system associated with the cloud network, a first request to provision a new protocol in the cloud network, wherein the compliance system comprises a maintenance module, a collection module, and an evaluation module;
   prior to provisioning the new protocol in the cloud network, initiating, by the maintenance module, a pre-provisioning evaluation of the new protocol, wherein initiating the pre-provisioning evaluation comprises:
      transmitting, by the maintenance module to the collection module, a second request to evaluate the new protocol;
      generating, by the collection module, an evaluation data file comprising the new protocol and data associated with executing the new protocol, wherein the data comprises information needed to provision the new protocol;
      transmitting, from the collection module to the evaluation module, the evaluation data file; and
      determining, by the evaluation module and responsive to receiving the evaluation data file, the pre-provisioning evaluation of the new protocol based on the evaluation data file, wherein the pre-provisioning evaluation indicates whether the new protocol is compliant or non-compliant with at least one of a rule or a scope of the cloud network.

2. The computer-implemented method of claim 1, wherein the compliance system further comprises an enforcement module, and wherein the method further comprises:
   forwarding, from the evaluation module to the enforcement module, the pre-provisioning evaluation of the new protocol;
   responsive to the pre-provisioning evaluation indicating that the new protocol is compliant with the cloud network, performing a first action of provisioning the new protocol in the cloud network; and
   responsive to the pre-provisioning evaluation indicating that the new protocol is non-compliant with the cloud network, performing a second action of preventing provisioning the new protocol in the cloud network.

3. The computer-implemented method of claim 2, wherein the compliance system further comprises an immutable database, and wherein the immutable database comprises a data fabric, wherein the method further comprises:
   receiving, by the immutable database, the evaluation data file from the collection module;
   receiving, by the immutable database, the pre-provisioning evaluation from the evaluation module; and
   recording the evaluation data file and the pre-provisioning evaluation in the data fabric.

4. The computer-implemented method of claim 3, wherein the immutable database further comprises a bitemporal ledger, wherein the bitemporal ledger stores a current execution timeline and an alternate execution timeline, wherein determining the pre-provisioning evaluation further comprises:
   generating, using the bitemporal ledger, the alternate execution timeline, wherein the alternate execution timeline comprises an execution space for testing the new protocol within the cloud network, wherein testing the new protocol results in a change to the cloud network, wherein the change is represented in the alternate execution timeline.

5. The computer-implemented method of claim 4, the method further comprising:
receiving, by the evaluation module, a plurality of protocol rules associated with enforcement of policies in the cloud network, wherein the pre-provisioning evaluation is based on determining whether the change is permitted by the plurality of protocol rules.

6. The computer-implemented method of claim 4, the method further comprising:
recording the alternate execution timeline and the change in the bitemporal ledger separate from the current execution timeline.

7. The computer-implemented method of claim 6, wherein the cloud network processes transactions associated with a financial account and wherein the change to the cloud network indicates an alternate transaction associated with the financial account, the method further comprising:
recording, by the immutable database, the transactions in a temporal sequence in the current execution timeline.

8. The computer-implemented method of claim 3, the method further comprising:
responsive to the pre-provisioning evaluation indicating that the new protocol is compliant with the cloud network, recording the first action in the immutable database; and
responsive to the pre-provisioning evaluation indicating that the new protocol is non-compliant with the cloud network, recording the second action in the immutable database.

9. The computer-implemented method of claim 2, wherein the compliance system further comprises a monitoring module, the method further comprising:
performing a post-provisioning evaluation of an updated protocol, wherein the updated protocol comprises a previously provisioned protocol in the cloud network and a modification to the previously provisioned protocol, wherein the post-provisioning evaluation comprises:
monitoring, by the monitoring module, a state of the cloud network, wherein the state of the cloud network includes the previously provisioned protocol;
detecting, based on the monitoring, a change in the state of the cloud network, wherein the change includes the modification to the previously provisioned protocol in the cloud network; and
transmitting, from the monitoring module to the collection module, the change in the state.

10. The computer-implemented method of claim 9, wherein the post-provisioning evaluation further comprises:
generating, by the collection module and responsive to the collection module receiving the change in the state, a second evaluation data file comprising the previously provisioned protocol; and
determining, by the evaluation module, the post-provisioning evaluation of the previously provisioned protocol based on the second evaluation data file, wherein the post-provisioning evaluation indicates whether the modification to the previously provisioned protocol is compliant or non-compliant with the cloud network.

11. The computer-implemented method of claim 10, the method further comprising:
forwarding, from the evaluation module to the enforcement module, the second evaluation data file;
responsive to the second evaluation data file indicating that the previously provisioned protocol is compliant with the cloud network, performing a third action of provisioning the modification to the previously provisioned protocol in the cloud network; and
responsive to the second evaluation indicating that the previously provisioned protocol is non-compliant with the cloud network, performing a fourth action of preventing the provisioning of the modification to the previously provisioned protocol in the cloud network.

12. A compliance system for a cloud network, the compliance system comprising:
a maintenance module configured to:
receive a first request to provision a new protocol in the cloud network;
initiate, by the maintenance module, an evaluation of the new protocol prior to provisioning the new protocol in the cloud network, wherein initiating the evaluation comprises transmitting, to a collection module, a second request to evaluate the new protocol;
the collection module configured to:
generate, responsive to receiving the second request, an evaluation data file comprising the new protocol and data associated with executing the new protocol, wherein the data comprises information needed to provision the new protocol; and
transmit the evaluation data file to an evaluation module; and
the evaluation module configured to determine a pre-provisioning evaluation of the new protocol based on the evaluation data file responsive to receiving the evaluation data file, wherein the pre-provisioning evaluation indicates whether the new protocol is compliant or non-compliant with at least one of a rule or a scope of the cloud network.

13. The system of claim 12, wherein the compliance system further comprises an enforcement module, and wherein the enforcement module is configured to:
receive, from the evaluation module, the pre-provisioning evaluation of the new protocol;
responsive to the pre-provisioning evaluation indicating that the new protocol is compliant with the cloud network, perform a first action of provisioning the new protocol in the cloud network; and
responsive to the pre-provisioning evaluation indicating that the new protocol is non-compliant with the cloud network, perform a second action of preventing the provisioning of the new protocol in the cloud network.

14. The system of claim 13, wherein the compliance system further comprises an immutable database, and wherein the immutable database comprises a data fabric, wherein the immutable database is further configured to:
receive the evaluation data file from the collection module;
receive the pre-provisioning evaluation from the evaluation module; and
record the evaluation data file and the pre-provisioning evaluation in the data fabric.

15. The system of claim 14, wherein the immutable database further comprises a bitemporal ledger, wherein the bitemporal ledger stores a current execution timeline and an alternate execution timeline, the bitemporal ledger is configured to:
generate the alternate execution timeline, wherein the alternate execution timeline comprises an execution space for testing the new protocol within the cloud network, wherein testing the new protocol results in a change to the cloud network, wherein the change is represented in the alternate execution timeline.

16. The system of claim 15, wherein the bitemporal ledger is further configured to:
record the alternate execution timeline and the change in the bitemporal ledger separate from the current execution timeline.

17. The system of claim 16, wherein the cloud network processes transactions associated with a financial account and wherein the change to the cloud network indicates an alternate transaction associated with the financial account, the bitemporal ledger further configured to:
record the transactions in a temporal sequence in the current execution timeline.

18. The system of claim 12 further comprising:
a monitoring module configured to:
perform a post-provisioning evaluation of an updated protocol, wherein the updated protocol comprises a previously provisioned protocol in the cloud network and a modification to the previously provisioned protocol.

19. The system of claim 18, wherein in performing the post-provisioning evaluation, the monitoring module is further configured to:
monitor a state of the cloud network, wherein the state of the cloud network includes the previously provisioned protocol;
detect, based on the monitoring, a change in the state of the cloud network, wherein the change includes the modification to the previously provisioned protocol in the cloud network; and
transmit, to the collection module, the change in the state.

20. A non-transitory computer-readable medium storing instructions, the instructions, when executed by a processor in a compliance system of a cloud network, cause the processor to perform operations comprising:
receiving, at the compliance system associated with the cloud network, a first request to provision a new protocol in the cloud network, wherein the compliance system comprises a maintenance module, a collection module, and an evaluation module;
prior to provisioning the new protocol in the cloud network, initiating, by the maintenance module, a pre-provisioning evaluation of the new protocol;
transmitting, by the maintenance module to the collection module, a second request to evaluate the new protocol;
generating, by the collection module, an evaluation data file comprising the new protocol and data associated with executing the new protocol, wherein the data comprises information needed to provision the new protocol;
transmitting, from the collection module to the evaluation module, the evaluation data file; and
determining, by the evaluation module and responsive to receiving the evaluation data file, the pre-provisioning evaluation of the new protocol based on the evaluation data file, wherein the pre-provisioning evaluation indicates whether the new protocol is compliant or non-compliant with at least one of a rule or a scope of the cloud network.

* * * * *